United States Patent
Kholoburdin et al.

(10) Patent No.: US 12,379,493 B2
(45) Date of Patent: Aug. 5, 2025

(54) OPTICAL SENSOR DEVICE FOR DETERMINING DISTANCE TO OBJECT AND VELOCITY OF THE OBJECT, AND IDENTIFYING THE SHAPE AND STRUCTURE OF THE OBJECT

(71) Applicant: Samsung Electronics Co., Ltd., Suwon-si (KR)

(72) Inventors: Viacheslav Sergeevich Kholoburdin, Moscow (RU); Vladislav Valerievich Lychagov, Moscow (RU); Vladimir Mikhailovich Semenov, Moscow (RU); Anastasiia Sergeevna Suvorina, Moscow (RU); Kirill Gennadievich Beliaev, Moscow (RU); Dmitrii Alexandrovich Shelestov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1014 days.

(21) Appl. No.: 17/459,513

(22) Filed: Aug. 27, 2021

(65) Prior Publication Data
US 2022/0107409 A1 Apr. 7, 2022

(30) Foreign Application Priority Data

Oct. 7, 2020 (RU) .......................... RU2020132894
Jan. 13, 2021 (KR) ........................ 10-2021-0004869

(51) Int. Cl.
*G01S 17/06* (2006.01)
*G01B 11/24* (2006.01)
(Continued)

(52) U.S. Cl.
CPC .............. *G01S 17/06* (2013.01); *G01B 11/24* (2013.01); *G01S 7/4815* (2013.01); *G01S 7/4816* (2013.01); *G01S 17/58* (2013.01)

(58) Field of Classification Search
CPC ...... G01S 17/06; G01S 7/4815; G01S 7/4816; G01S 17/58; G01B 11/24
See application file for complete search history.

(56) References Cited

U.S. PATENT DOCUMENTS

| | | | |
|---|---|---|---|
| 5,812,629 A | 9/1998 | Clauser | |
| 5,926,266 A | 7/1999 | Dorundo et al. | |

(Continued)

FOREIGN PATENT DOCUMENTS

| | | | |
|---|---|---|---|
| BY | 13509 C1 | 8/2010 | |
| CN | 87 1 04232 A | 12/1988 | |

(Continued)

OTHER PUBLICATIONS

Ikeuchi and Sato, "Determining Reflectance Properties of an Object Using Range and Brightness Images", IEEE Transactions on Pattern Analysis and Machine Learning, vol. 13, No. 11, Nov. 1991. (Year: 1991).*

(Continued)

*Primary Examiner* — Isam A Alsomiri
*Assistant Examiner* — Kara M. Richter
(74) *Attorney, Agent, or Firm* — Jefferson IP Law, LLP

(57) ABSTRACT

A miniature optical sensing device for determining distance to an object and velocity of the object, and identifying the shape and structure of the object, for example, a solid-state LIDAR, and a method for determining distance to an object and velocity of the object, and identifying the shape and structure of the object by using the optical sensing device is provided. The sensing device includes optically coupled one laser radiation source, at least one optical collimator, a (Continued)

beam-splitter, a light reflector, an optical beam guide, at least one detector for detecting radiation reflected from the object, as well as a controller, wherein the at least one detector corresponding to the respective at least one laser radiation source forms individually functioning and individually adjustable measuring channels with the possibility of providing data about the object, and the controller is configured to ensure the simultaneous or selective operation of the measuring channels.

24 Claims, 24 Drawing Sheets

(51) Int. Cl.
  *G01S 7/481* (2006.01)
  *G01S 17/58* (2006.01)

(56) References Cited

U.S. PATENT DOCUMENTS

| | | | |
|---|---|---|---|
| 6,088,102 A * | 7/2000 | Manhart | H04N 5/7458 |
| | | | 348/E5.142 |
| 6,128,092 A | 10/2000 | Levesque et al. | |
| 6,144,118 A | 11/2000 | Cahill et al. | |
| 6,615,102 B1 | 9/2003 | Morfino | |
| 7,244,932 B2 | 7/2007 | Nakasuji et al. | |
| 7,259,373 B2 | 8/2007 | Zani et al. | |
| 7,283,214 B2 | 10/2007 | Xu et al. | |
| 7,544,945 B2 | 6/2009 | Tan et al. | |
| 8,498,176 B2 | 7/2013 | Meldahl et al. | |
| 8,526,006 B2 | 9/2013 | Nebosis et al. | |
| 8,537,367 B2 | 9/2013 | Froggatt | |
| 8,605,289 B2 | 12/2013 | Koerner et al. | |
| 8,692,979 B2 | 4/2014 | Moench et al. | |
| 8,797,549 B2 | 8/2014 | Meldahl et al. | |
| 8,810,797 B2 | 8/2014 | Nebosis et al. | |
| 9,322,740 B2 | 4/2016 | Liu et al. | |
| 9,392,259 B2 | 7/2016 | Boriwski | |
| 9,397,476 B2 | 7/2016 | Baier et al. | |
| 9,812,840 B2 | 11/2017 | Bourderionnet et al. | |
| 10,215,846 B2 | 2/2019 | Carothers | |
| 10,663,586 B2 | 5/2020 | Pacala et al. | |
| 11,002,669 B2 * | 5/2021 | Wetzel | G01C 15/002 |
| 11,442,149 B2 * | 9/2022 | Maleki | G01S 17/34 |
| 11,448,754 B2 * | 9/2022 | Cattle | G01S 13/9058 |
| 11,630,189 B2 * | 4/2023 | Boyraz | G01S 7/4802 |
| | | | 356/5.09 |
| 2004/0140780 A1 | 7/2004 | Cahill et al. | |
| 2006/0256350 A1 | 11/2006 | Nolte et al. | |
| 2009/0002716 A1 | 1/2009 | Nolte et al. | |
| 2010/0277714 A1 | 11/2010 | Pedersen et al. | |
| 2011/0007299 A1 | 1/2011 | Moench et al. | |
| 2016/0139266 A1 | 5/2016 | Montoya et al. | |
| 2017/0123052 A1 | 5/2017 | Hinderling | |
| 2019/0146061 A1 | 5/2019 | Carothers | |
| 2019/0178624 A1 | 6/2019 | Dewald et al. | |
| 2020/0124711 A1 * | 4/2020 | Rezk | G01S 7/4811 |
| 2020/0209361 A1 * | 7/2020 | Maier | G01S 7/4817 |
| 2021/0025689 A1 | 1/2021 | Chen et al. | |
| 2021/0405194 A1 * | 12/2021 | Tsuchida | G01S 7/497 |
| 2022/0043149 A1 * | 2/2022 | LaChapelle | G01S 7/4865 |

FOREIGN PATENT DOCUMENTS

| | | |
|---|---|---|
| CN | 1308741 A | 8/2001 |
| CN | 101555990 A | 10/2009 |
| CN | 101617193 A | 12/2009 |
| CN | 101617196 A | 12/2009 |
| CN | 101682169 A | 3/2010 |
| CN | 101248505 B | 12/2010 |
| CN | 102322880 A | 1/2012 |
| CN | 101273284 B | 11/2012 |
| CN | 102016494 B | 12/2012 |
| CN | 102253606 B | 8/2013 |
| CN | 103344569 A | 10/2013 |
| CN | 105092015 A | 11/2015 |
| CN | 105674875 B | 8/2018 |
| CN | 108364879 A | 8/2018 |
| CN | 108897003 A | 11/2018 |
| CN | 103840369 B | 1/2019 |
| CN | 106017360 B | 1/2019 |
| CN | 106017361 B | 1/2019 |
| CN | 106066203 B | 1/2019 |
| CN | 109238355 A | 1/2019 |
| CN | 109856644 A | 6/2019 |
| CN | 106371056 B | 7/2019 |
| CN | 110174058 A | 8/2019 |
| CN | 108181237 B | 9/2019 |
| CN | 108489594 B | 2/2020 |
| EP | 1 271 606 A1 | 1/2003 |
| EP | 1 055 163 B1 | 11/2007 |
| EP | 2 469 294 A1 | 6/2012 |
| JP | 2020-101453 A | 7/2020 |
| KR | 10-2019-0026956 A | 3/2019 |
| KR | 10-2064777 B1 | 1/2020 |
| KR | 10-2020-0095940 A | 8/2020 |
| RU | 167 276 U1 | 12/2016 |
| WO | 98/049546 A1 | 11/1998 |
| WO | 00/017724 A1 | 3/2000 |
| WO | 2004/048285 A1 | 6/2004 |
| WO | 2006/083917 A2 | 8/2006 |
| WO | 2007/020396 A1 | 2/2007 |
| WO | 2008/135903 A2 | 11/2008 |
| WO | 2009/106820 A1 | 9/2009 |
| WO | 2010/083269 A2 | 7/2010 |
| WO | 2012/085151 A1 | 6/2012 |
| WO | 2012/098297 A1 | 7/2012 |
| WO | 2015/026471 A1 | 2/2015 |
| WO | 2018/133084 A1 | 7/2018 |
| WO | 2019/108694 A1 | 6/2019 |
| WO | 2019/115278 A1 | 6/2019 |
| WO | 2020/106036 A1 | 5/2020 |

OTHER PUBLICATIONS

Rhodes et al., Springer Series in optical sciences, Vladimir V. Protopopov, Laser Heterodyning, Optical Heterodyning, 2009, Springer Heidelberg Dordrecht London New York.
Jacobs, Stephen "Technical Note on Heterodyne Detection in Optical Communications" Syosset, Nov. 30, 1962 New York: Technical Research Group, Inc.
Russian Search Report dated Apr. 26, 2021, issued in Russian Patent Application No. 2020132894/28.
Russian Decision to Grant a Patent dated Apr. 27, 2021, issued in Russian Patent Application No. 2020132894/43.
International Search Report dated Oct. 22, 2021, issued in International Patent Application No. PCT/KR2021/008161.

* cited by examiner

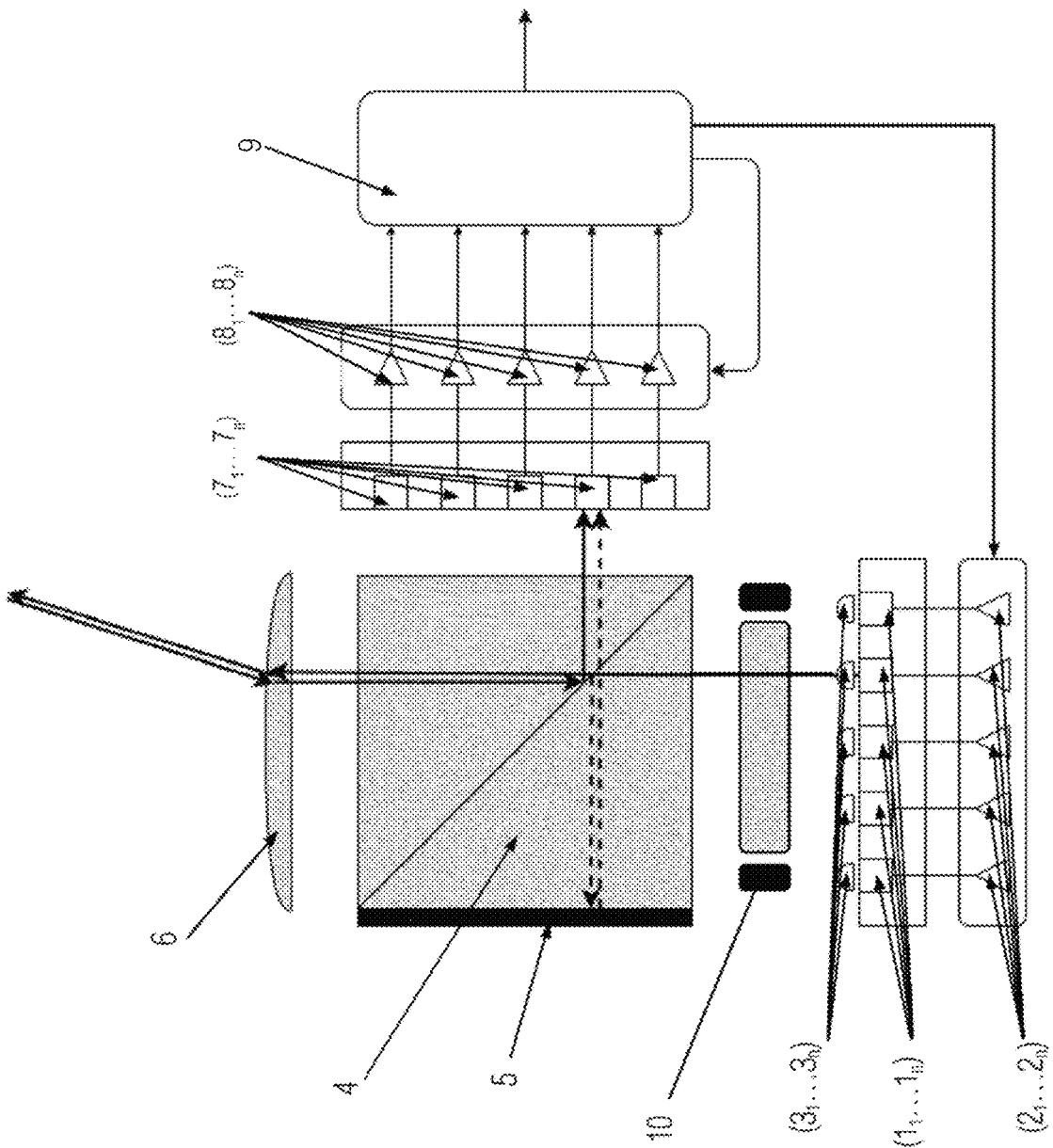

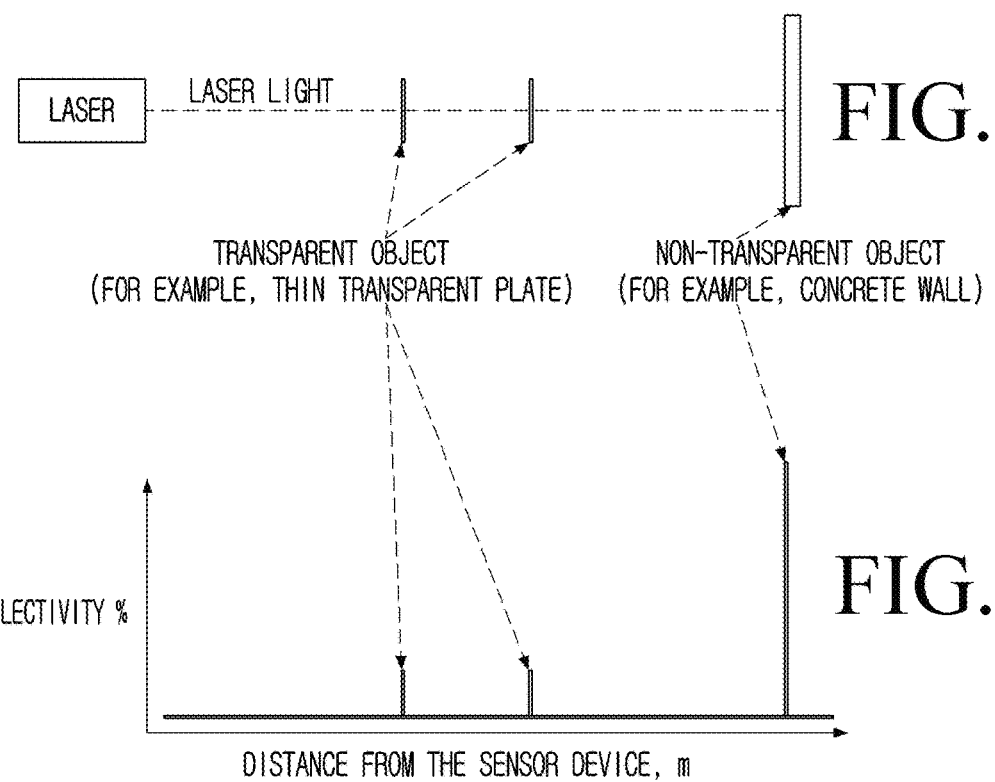

FIG. 13

| Technology | Claimed sensor device | Flash ToF | Stereocamera | Triangulation |
|---|---|---|---|---|
| Example | Claimed sensor device | Benewake C30A | Stereolabs ZED | RPLidar M8A1 |
| Range | 6 m | 4 m | 25 m | 6 m |
| Mechanical scanning | no | no | no | yes |
| Dead zone radius | none | 10 cm | 100 cm | 15 cm |
| Accuracy | < 1 mm | 1 cm | 10 cm | 5 cm |
| Same-sensor interference | Fully immune by design | Full interference | Fully immune by design | Full interference |

Table 1

OPTICAL SENSOR DEVICE FOR DETERMINING DISTANCE TO OBJECT AND VELOCITY OF THE OBJECT, AND IDENTIFYING THE SHAPE AND STRUCTURE OF THE OBJECT

CROSS-REFERENCE TO RELATED APPLICATION(S)

This application is based on and claims priority under 35 U.S.C. § 119(a) of a Russian patent application number 2020132894, filed on Oct. 7, 2020, in the Russian Patent Office, and of a Korean patent application number 10-2021-0004869, filed on Jan. 13, 2021, in the Korean Intellectual Property Office, the disclosure of each of which is incorporated by reference herein in its entirety.

BACKGROUND

1. Field

The disclosure relates to a miniature optical sensing device for determining distance to an object and velocity of the object, and identifying the shape and structure of the object, for example, a solid-state Light Identification Detection and Ranging Systems (LIDAR), and a method for determining distance to an object and velocity of the object, and identifying the shape and structure of the object by using the optical sensing device. The disclosure can be used in various fields of technologies.

More particularly, the disclosure relates to an optical sensor device configured to determine distance to an object and velocity of the object, as well as the structure of the object and the structure or material of which the object is made. Also, the device can be used in sensors for navigation purposes in mobile electronic devices and compact portable devices such as for household purposes, for example, vacuum cleaners, and in other household appliances to expand their functions, in particular as a gesture sensor, as well as for industrial purposes for navigating an object and contactless identification of object parameters, for example, the structure and material (composition) of an object.

2. Description of Related Art

LIDARs or range determination devices that stand for Light Identification Detection and Ranging Systems were originally designed for military purposes, and were aimed at tracking targets (objects) over long distances of tens of kilometers. However, with the growing popularity of portable electronic devices, the demand has grown for compact LIDARs for identifying objects over short distances (several meters) in closed spaces, which are used in compact robotics such as compact household vacuum cleaners.

LIDARs known from the prior art operate according to the following principle.

A device in the form of an Infrared (IR) Light Emitting Diode (LED) or a laser outputs directed radiation, and then receives reflected waves by a light-sensitive receiver (sensor) and forms a picture of space.

Having determined the time during which the reflected wave returned, it is possible to determine the distance to the object in the sensor's field of view, for example, according to the equation.

$$D = \frac{c}{2} \cdot \frac{1}{2\pi f} \cdot \Delta\varphi$$

Here, D is the measured distance, c is the speed of light in the optical medium, f is the frequency of scanning pulses, and $\Delta\varphi$ is the phase shift. This principle of determining the distance is called Time-of-Flight (ToF).

Known from the prior art is a compact chip scale LIDAR solution (see U.S. Pat. No. 10,215,846 B2, published on Feb. 26, 2019, IPC G01S 17/02), and the LIDAR system operates according to the time-of-flight principle. The LIDAR system includes a static monolithic LIDAR transceiver 202, a collimating optic, and a first and a second rotatable wedge prisms 206, 208. The static monolithic LIDAR transceiver is configured to transmit a laser beam and receive reflected laser light from a first target object. By rotating the wedge prism 206 relative to the wedge prism 208, the collimated laser beam can be controlled due to refraction of the collimated laser beam as it passes through the wedge prisms 206 and 208. The static monolithic LIDAR transceiver 202 is configured to transmit a laser beam and receive reflected laser light from a first target object. In this LIDAR system, the emitter and the detector are combined on a single transceiver chip 202. In this case, the system has the following disadvantages: mechanical motors 210, 212 are required to rotate the wedge-shaped prisms 206, 208, which leads to enlargement of the size of the device, and therefore, it is impossible to use the LIDAR in compact electronic devices. In addition, traditionally, high-speed electronics is required for a time-of-flight solution to measure the time of flight in ns units, which significantly complicates and increases the cost of manufacturing the LIDAR system. The LIDAR system provides information concerning only the distance to the object. The specified LIDAR system is experiencing illumination from other sources and noise from interference from other possible LIDARs located in the area of operation of the LIDAR system, and the fact significantly reduces the accuracy of obtaining data on the distance to the object.

Known from U.S. Pat. No. 7,544,945 B2 (published on Jun. 9, 2009, IPC G01J 5/02) is a Vertical Cavity Surface Emitting Laser (VCSEL) array laser scanner, and this scanner also refers to a time-of-flight solution. The system 100 is used in vehicle based LIDAR systems. The system 100 includes a semiconductor laser array 110 having a plurality of semiconductor lasers 120, and an optics element 130 mounted such that at least two of the plurality of lasers produce beams that exit the optical element in substantially different directions, and a control circuit associated with the plurality of semiconductor lasers and configured to sequentially and separately activate at least two of the plurality of lasers. By sequentially activating the individual semiconductor lasers separately, the system 100 can be used to scan the field of view of the lens 130 by the laser beam. One or more photodetectors may be located near the laser array 110 to collect light from an activated laser, and the light is reflected by objects illuminated by the laser beam. Angular information such as the direction of a detected object is determined from the information regarding which semiconductor laser of the array has been activated. Lenses can also be integrated or linked to photodetectors to improve detection efficiency and increase the detected signal level. The system 100 operates such that it can replace LIDAR laser systems where mechanical drives to rotate or move reflective optics are used. In this case, the lasers 120 and the photodetectors are located on a single chip.

It should be noted that this system based on the time-of-flight principle has all the disadvantages inherent to the solution disclosed in U.S. Pat. No. 10,215,846 B2, i.e., high-speed electronics is needed to measure the time of flight in ns units, which complicates and increases the cost of manufacturing the LIDAR system greatly, and the LIDAR system provides information only about the distance to an object. The specified LIDAR system is experiencing illumination from other sources and noise from interference from other possible LIDARs located in the area of operation of the LIDAR system, and the fact significantly reduces the accuracy of obtaining data on the distance to the object.

Known from the prior art is a laser radar (see WO 2018/133084 A1, published on Jul. 26, 2018, IPC G01S 17/08), and the laser radar 100 includes an array of Vertical Cavity Surface Emitting Lasers (VCSELs) on a first substrate 110 and an array of detectors 143 on a second substrate 120, wherein the detectors and the lasers are disposed on one chip. The detectors 143 are configured to detect laser beams emitted by the VCSELs 150 and backscattered by an object, wherein the first substrate 110 is mounted to the second substrate 120 and is configured to allow the laser beams emitted by the VCSELs 150 and backscattered by the object to pass through the first substrate 110 and reach the detectors 143.

It should be noted that this system based on the time-of-flight principle has all the disadvantages inherent to such solutions, i.e., high-speed electronics is needed to measure the time of flight in ns units, which complicates and increases the cost of manufacturing the LIDAR system greatly, and the specified LIDAR system provides information only about the distance to an object. The specified LIDAR system is experiencing illumination from other sources and noise from interference from other possible LIDARs located in the area of operation of the LIDAR system, and the fact significantly reduces the accuracy of obtaining data on the distance to the object.

The closest analog to the claimed disclosure is a solution based on the principle of self-mixing interference and disclosed in U.S. Pat. No. 8,692,979 B2, published on Apr. 8, 2014, IPC G01C 3/00. The laser sensor system includes a sensor module 1 for measuring the distance to a target and/or the velocity of the target 50, the sensor module 1 including at least one laser source 100 such as a Vertical Cavity Surface Emitting Laser (VCSEL), at least one detector 200, and at least one control element 400, wherein the VCSEL laser and the detector are integrated in one device. The detector 200 is configured to detect modulated laser light in the laser source 100. The modulation of the laser light in the laser source may be induced by laser light reflected by the target reentering the laser source. The effect is known as Self-Mixing-Interference (SMI) by those skilled in the art. Either the distance and/or the velocity of the target can be detected depending on the electrical driving scheme of the laser source. The laser sensor is based on the principle of frequency modulated continuous wave (FMCW). This design does not have problems inherent in time-of-flight solutions, i.e., the possibility of exposure from other radiation sources and interference from other similar devices. However, the emitting region of VCSEL lasers is quite small and amounts to 10-15 microns, which in turn causes a rather low signal-to-noise ratio of the laser sensor. The laser sensor can only measure the distance to the target.

Thus, to eliminate all of the above disadvantages of the prior art LIDARS, a miniature optical sensing device for determining distance to an object and velocity of the object, and identifying the shape and structure of the object, and a method for determining distance to an object and velocity of the object, and identifying the shape and structure of the object by using the optical sensing device are proposed.

As already mentioned above, the object of the claimed disclosure is to create a sensor device which operates over short distances, in particular 1-10 m, and is safe for the user's eyes, and which provides, in addition to obtaining the distance of both a stationary and a moving object and the velocity of the object, the shape of the object and its structure, i.e., the type of the material from which the object under study is made.

In addition, in traditional devices for determining a distance, i.e., in LIDARS, mechanical motors are provided to ensure the rotation of the platform on which means for scanning the object are installed (rotary prisms, etc.). However, unlike the traditional devices, there are no moving mechanical parts in the claimed sensor device, which increases the manufacturability and reliability of operation of the LIDAR. In addition, the claimed sensor device uses coherent detection, i.e., a detection where only a signal being coherent with a local oscillator undergoes significant amplification whereas any other signals being incoherent to the local oscillator will not be amplified and will be invisible against the background noise, and thus any such means operating nearby will not interfere. Also, the possibility of exposure of the claimed sensor device to other radiation sources is excluded, for example, to the sun or external artificial lighting, in particular street lamps. The claimed sensor device is made with the ability to quickly reconfigure operating parameters by adjusting the current supplied to the laser radiation sources, and it has a low weight (several tens of grams), which allows it to be embedded in mobile electronic devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a miniature optical sensing device which is capable of determining (identifying) distance to an object and velocity of the object, and identifying the shape and structure of the object, and a method therefor.

Additional aspects will be set forth in part in the description which follows and, in part, will be apparent from the description, or may be learned by practice of the presented embodiments.

In accordance with an aspect of the disclosure, an optical sensing device (or, a sensor device) for determining distance to an object and velocity of the object, and identifying the shape and structure of the object is provided. The optical sensing device includes an optically coupled at least one laser radiation source, at least one optical collimator located above the corresponding at least one laser radiation source; beam-splitter, light reflector, optical beam guide configured to direct the beam in a predetermined direction towards the object, at least one detector for detecting radiation reflected from the object, and a controller (e.g., it may be a processor) connected respectively to the at least one detector and the at least one laser radiation source, wherein the at least one detector corresponding to the respective at least one laser radiation source forms at least one individually functioning and individually adjustable measuring channel, the channel configured with the possibility of providing data of the object (or, to provide data of the object), and the controller is configured to ensure simultaneous or selective operation of the measuring channels and operational control of radiation parameters of the at least one laser radiation source, depending on the required operational range resolution during the operation of the device, and processing and analysis of the object data sensed by the at least one detector for determination of the object distance L and the velocity V, and identification of the shape and structure of the object, simultaneously.

In the sensor device, the at least one laser radiation source is a wavelength tunable laser, for example, a Vertical Cavity Surface Emitting Laser (VCSEL) with a radiation wavelength from 700 to 950 nm.

The at least one laser radiation source may include a number of laser radiation sources forming a two-dimensional array of laser radiation sources, where the at least one detector is an array photodetector, or the at least one detector includes a number of detectors forming a two-dimensional array of detectors.

It should be noted that the at least one optical collimator is at least one microlens, and the at least one optical collimating means is configured to collimate radiation emitted by at least one laser radiation source, or the at least one microlens is a set of microlenses forming a two-dimensional array of microlenses.

Further, the beam splitter is a beam-splitting cube with a semi-reflecting mirror located inside the cube and configured to split the beam into a reference beam and a measurement beam, and the light reflecting means is a light-reflecting coating applied to the inner or outer surface of the beam-splitting cube and configured to re-reflect the reference beam to the corresponding detector, or the light reflecting means is a mirror located in front of the outer surface of the beam-splitting cube and configured to re-reflect the reference beam onto the corresponding at least one detector.

It should also be noted that the optical means for guiding the beam is a lens having a flat surface on the side facing the beam-splitting cube, and having a surface consisting of at least one microlens on the side facing the object, wherein the respective at least one microlens corresponds to the at least one laser radiation source.

Moreover, the respective at least one microlens is located at a predetermined angle to the corresponding incident laser beam and is made such that the corresponding laser beam, after passing through the microlens, is directed in the desired predetermined direction towards the object.

The optical means for guiding the beam is configured as a two-dimensional array of microlenses, wherein the respective microlenses of the array of microlenses are located at a predetermined angle to the corresponding incident laser beam and are configured to direct the corresponding laser beam, after passing through the microlens, in the required predetermined direction to the object.

The device according to the disclosure further includes at least one driver, and the at least one driver is connected to the corresponding at least one laser radiation source, and is configured to provide a pumping current to the laser radiation source according to the control signal of the controller.

In addition, the device further includes an optical isolator, and the optical isolator is located between the beam-splitting means and the at least one optical collimating means, and is configured to prevent the light reflected from the target object from hitting at least one laser radiation source, and prevent destabilization of the operations of the laser radiation sources.

One of the advantages of the claimed sensor device according to the first aspect of the disclosure is its multi-modality. The sensor device can function as a gesture sensor by providing operational control of the radiation parameters of the at least one laser radiation source, as well as adjusting the range and field of view resolution. Adjusting of the radiation parameters is provided by changing the parameters of the pumping current supplied to the at least one laser radiation source, whereas the parameters of the pumping current include the frequency and amplitude of modulation of the current supplied to the at least one radiation source.

Adjusting of the range resolution is provided by simultaneously performing change of the number of functioning laser radiation sources and change of the amplitude of the pump current modulation supplied to the laser radiation sources.

In this case, adjusting of the field of view is provided by changing the number of interrogated detectors.

The sensor device can function as a three-dimensional scanner by providing an alternating operation of the laser sources, operatively adjusting the radiation parameters of at least one laser source, and adjusting the range and field of view resolution.

In this case, adjusting of the radiation parameters is provided by changing the parameters of the pump current supplied to the at least one laser radiation source.

The pump current parameters include the frequency and amplitude of the modulation of the current supplied to the specified at least one radiation source.

In addition, range resolution control is provided by changing the number of simultaneously operating laser radiation sources and changing the amplitude of the pump current modulation supplied to the laser radiation sources, and control of the field of view is ensured by changing the number of interrogated detectors.

In accordance with another aspect of the disclosure, a method for determining distance to an object and velocity of the object, and identifying the shape and structure of the object by using an optical sensing device for determining distance to an object and velocity of the object, and identifying the shape and structure of the object is provided. The method includes the operations of emitting laser radiation with a predetermined wavelength from 700 to 950 nm using at least one laser radiation source, while operatively adjusting the pumping current supplied to the at least one laser radiation source, depending on the required resolution of the object during the operation of the device, whereas the pumping current is regulated from 3 to 6 mA, and directing the specified radiation to the beam splitter, where a part of the radiation, representing the reference beam, is redirected to the at least one detector, and the other part of the radiation, representing the measuring beam, is directed to the optical means for guiding the beam, ensuring deflection of the measuring beam in a predetermined direction towards the object, then the at least one measuring beam reflected from the object is directed to the corresponding at least one detector, where the frequency difference of the signals generated by the measuring beam and the reference beam is measured, and on the basis of the measured frequency difference, the distance L of the object and the velocity V of the object are determined simultaneously, wherein, as the measuring beam is being passed through the object and/or is reflected from it, registration of the distribution of the reflection coefficient of the at least one measuring beam reflected from the object, depending on the object distance, is performed, based on which the shape and structure of the object are determined.

The distance L (m) of the object is determined by the following ratio $$L = \frac{c(\Delta\omega_1 + \Delta\omega_2)}{4\alpha},$$

where c is the speed of light (m/s), and a is the rate of increase of the radiation frequency (Hz/s),
$\Delta\omega 1$ is the frequency difference of the signals formed by the measuring beam and the reference beam as the radiation frequency (Hz) increases, and
$\Delta\omega 2$ is the frequency difference of the signals generated by the measuring beam and the reference beam when the radiation frequency (Hz) is dropped.

Further, the velocity V (m/s) of the object is determined by the following ratio $$V = \frac{c(\Delta\omega_1 + \Delta\omega_2)}{2\omega_0},$$

where c is the speed of light (m/s), and a is the rate of increase of the radiation frequency (Hz/s),
$\omega 0$ is the frequency of the emitted light (Hz),
$\Delta\omega 1$ is the frequency difference of the signals formed by the measuring beam and the reference beam as the radiation frequency (Hz) increases, and
$\Delta\omega 2$ is the frequency difference of the signals generated by the measuring beam and the reference beam when the radiation frequency (Hz) is dropped.

In the operation of adjusting the pump current supplied to at least one laser radiation source, an operational change in the resolution (Res) of the distance of the object is provided, determined by the following relationship $$Res = \frac{c}{2\Omega dI}$$

where c is the speed of light (m/s),
$\Omega$ is the dependence of the frequency of the emitted laser light depending on the current pumped into the at least one laser radiation (Hz/mA) source 11 . . . 1n, and
dI is the current amplitude modulation of the laser radiation source during scanning of the object (mA).

In the method according to the disclosure, the operation of identifying the shape and structure of the object is carried out in the controller by comparing the obtained pattern of the distribution of the reflection coefficient of the at least one measuring beam reflected from the object with the known patterns of the distribution of the reflection coefficients inherent in certain structures of objects stored in the controller's memory.

According to the aforementioned various embodiments of the disclosure, an optical sensing device which is capable of determining distance to an object and velocity of the object, and identifying the shape and structure of the object, and a method therefor can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2E illustrates a schematic diagram of the optical sensing device for determining distance and velocity of objects and identifying the shapes and structures of the objects according to an embodiment of the disclosure;

FIGS. 6A and 6B are diagrams of the distribution of the reflection coefficient along the path of the laser beam, corresponding to an example of locations of transparent and opaque objects (two thin glass plates as an example of transparent objects and a concrete wall as an example of an opaque object) on the path of the laser beam, and an example of arrangement of transparent and opaque objects according to various embodiments of the disclosure;

FIG. 13 is a table presents the results of the obtained studies of parameters of the claimed sensor device and of similar devices known from the prior art according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to the disclosure, an optical sensing device for determining distance and velocity of an object, and identifying the shape and structure of the object is provided. The principle of operation of the claimed optical sensor device for determining distance and velocity of an object, and identifying the shape and structure of the object is based on a heterodyne measurement method well known from the prior art (see, for example, Jacobs, Stephen (Nov. 30, 1962) Technical Note on Heterodyne Detection in Optical Communications (PDF) (Report). Syosset, New York: Technical Research Group, Inc.), and the method is based on comparing the frequency of the investigated light signal with the frequency of the signal of the local oscillator-laser.

Figure 1:
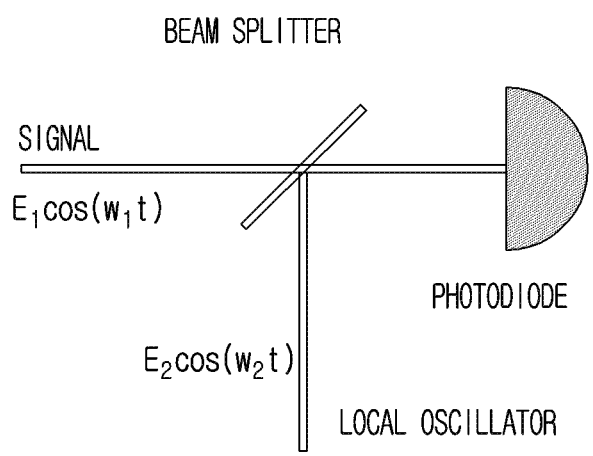
FIG. 1 illustrates a schematic diagram of a prior art heterodyne measurement method according to an embodiment of the disclosure.

FIG. 1 shows a general diagram of a heterodyne measurement method according to an embodiment of the disclosure.

Referring to FIG. 1, a light signal representing a generated electric field ($E_1 \cos(\omega_1 t)$) and oscillating with a very high frequency, which is reflected from an object, and a signal from a heterodyne or a local oscillator (laser), which is an electric field signal ($E_2 \cos(\omega_2 t)$) oscillating with a very high frequency, converge on a photodiode by using a beam splitter, where the photocurrent is measured. The photodiode serves as an ideal square law detector since it measures optical power that is proportional to the electric field squared. In contrast, if the frequencies of the light signal and the signal from the oscillator differ slightly (approximately kHz or MHz), the photodiode determines this frequency difference.

The current I passing through the photodiode is proportional to a square of a resulting electric field:

$$I(t) = (E_1 \cos(\omega_1 t) + E_2 \cos(\omega_2 t))^2 \qquad \text{Equation 1}$$

where: I is the resulting current of the photodiode caused by imposing the local and measuring beams on the photodiode, simultaneously;

$E_1$ is an electric field strength of the light signal;

$E_2$ is an electric field strength of a local oscillator;

$\omega_1$ is the frequency of the electric field of the light signal;

$\omega 2$ is the frequency of the electric field of the local oscillator signal; and t is time.

After a series of transformations, the following relationship 2 characterizing the current I through the photodiode is obtained:

$$I \sim \left[\frac{E_1^2}{2} + \frac{E_2^2}{2} + E_1 E_2 \cos(\Delta \omega t)\right] + \left[\frac{E_1^2 \cos(2\omega_1 t)}{2} + \frac{E_2^2 \cos(2\omega_2 t)}{2} + E_1 E_2 \cos((\omega_1 + \omega_2)t)\right] \qquad \text{Equation 2}$$

The current I passing through the photodiode is characterized by two components: where the first component (left square bracket) is the sum of the powers of the light signal and the oscillator signal and the signal oscillating at a frequency difference (equal to the difference between two frequencies, namely, the frequencies of the light signal and the oscillator signal), and the second component (right square bracket) represents signals that oscillate at very high frequencies (above optical) and, therefore, are not detected by the photodiode. The left component represents the following ratio:

$$I \sim \frac{E_1^2}{2} + \frac{E_2^2}{2} + E_1 E_2 \cos(\Delta \omega t) \qquad \text{Equation 3}$$

where: the component $$\frac{E_1^2}{2} + \frac{E_2^2}{2}$$

is filtered using a high-pass filter, and the component $E_1E_2 \cos(\Delta\omega t)$ characterizes the heterodyne signal characterizing the frequency difference, which is detected by the photodetector.

By modulating the laser's frequency linearly according to time (i.e., the frequency of the electromagnetic field emitted by the laser), it is possible to obtain a linear dependency of the difference between the two frequencies $\Delta\omega$ (namely, the light signal frequency and the oscillator signal frequency) (Hz) on the distance to the object that reflected the light signal:

$$\Delta\omega = \frac{2L}{c}\alpha \qquad \text{Equation 4}$$

where: L is a distance to an object (m);
c is the speed of light (m/s); and
$\alpha$ is the frequency of laser radiation frequency change (Hz/s).

Thus, the distance to the object and the frequency of the local oscillator signal (heterodyne) are linearly related, and having determined the frequency of the local oscillator signal, it is possible to calculate the distance to the object that reflects the light signal:

$$L = \frac{\Delta\omega c}{2\alpha}. \qquad \text{Equation 5}$$

Thus, the current through the photodiode is the sum of harmonic signals, and for the individual harmonic signal, the frequency of this signal will determine the distance to the object that reflected the light, and the amplitude of this harmonic signal will determine the reflectance of this object. For spectral analysis of the photodiode current (i.e., for determining frequencies and amplitudes of constituent harmonic signals), the fast Fourier transform method can be applied.

The following are preferred embodiments and examples of the optical sensing device with reference to FIGS. 2A, 2B, 2C, 2D, and 2F.

Figure 2A:
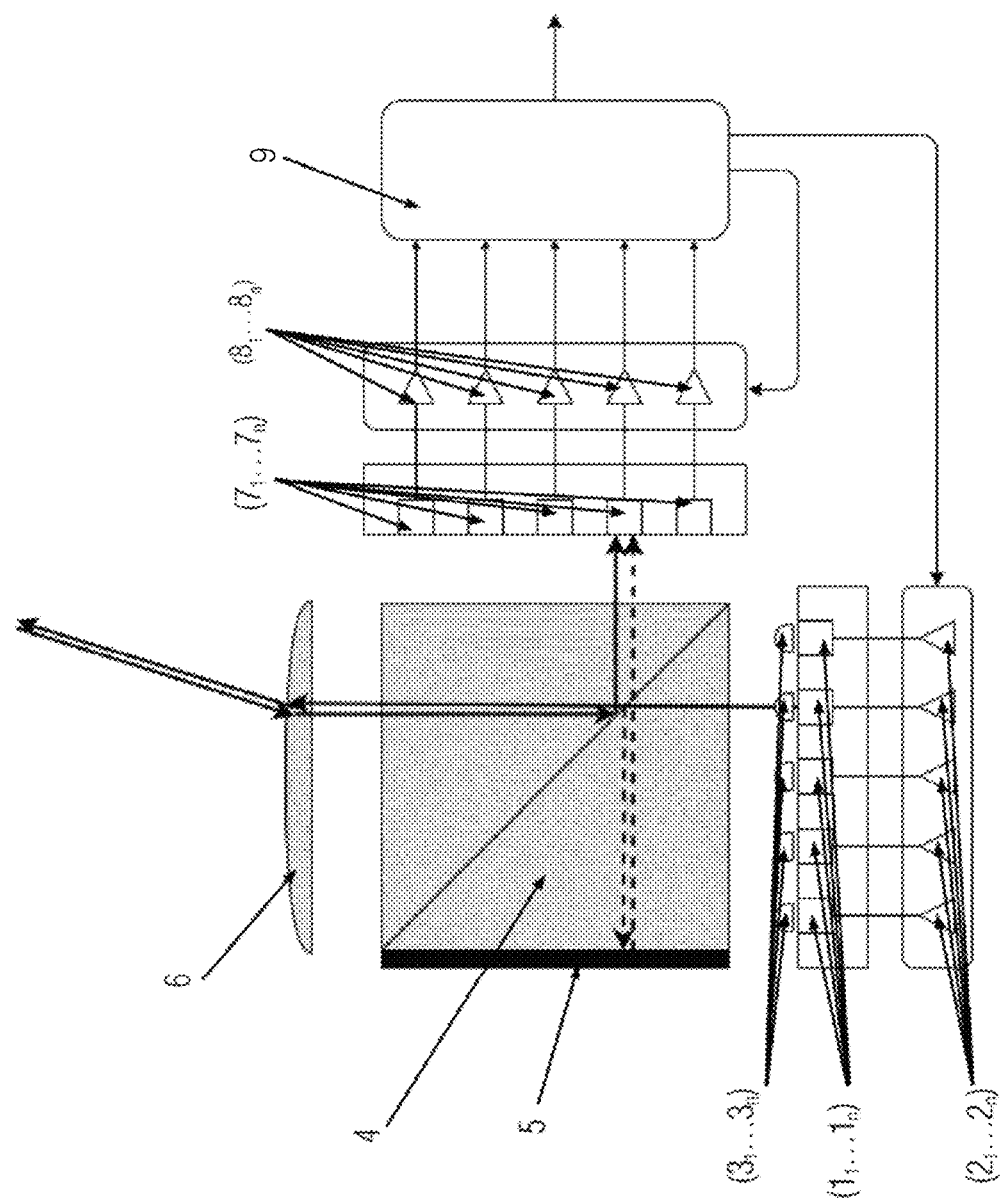
FIG. 2A illustrates a schematic diagram of the optical sensing device for determining distance and velocity of objects and identifying the shapes and structures of the objects according to an embodiment of the disclosure.

FIG. 2A shows a configuration of the optical sensor device for determining distance and velocity of objects and identifying the shapes and structures of the objects (hereinafter, referred to as the sensor device) according to an embodiment of the disclosure.

Referring to FIG. 2A, a device includes at least one source $1_1 \ldots 1n$ of laser radiation (hereinafter, referred to as the laser), in particular, a surface-emitting laser with a vertical resonator (VCSEL), operating in the wavelength range of about 700-950 nm, configured with the possibility of operatively adjusting the radiation parameters by means of the corresponding at least one driver $2_1 \ldots 2n$ according to a signal from the main controller 9.

For the respective at least one source $1_1 \ldots 1n$ of laser radiation, a corresponding at least one collimating optics $3_1 \ldots 3n$ is provided, for example, in the form of at least one collimating microlens located above the sources $1_1 \ldots 1n$ of laser radiation, and a beam-splitting means 4, for example, a beam-splitting cube 4 has a semi-reflecting mirror (not shown) located inside the cube, and is configured to divide the beam into reference and measurement beams. In addition, the beam-splitting cube 4 includes a reflective means 5 in the form of a light-reflecting surface located on the outer or inner surface of the side face of the beam-splitting cube 4, or in the form of a mirror 5 (see FIG. 2C) located in front of the side face of the beam-splitting cube 4.

The sensor device also includes a beam directing optical means 6 which is configured to direct at least one collimated radiation beam in a predetermined direction, and while simultaneously operating several laser sources $1_1 \ldots 1n$, the beam directing optical means 6 deflects the respective emitted laser beams in a predetermined direction. The optical means 6 for directing the beam is a lens having a flat surface on the side facing the beam—splitting cube 4, and has a surface consisting of at least one microlens on the side facing the object, while the respective at least one microlens corresponds to at least one laser source. Here, the respective at least one microlens is located at a predetermined angle to the corresponding incident laser beam, and is configured such that the corresponding laser beam, after passing through the microlens, is directed in the required predetermined direction.

Figure 8:
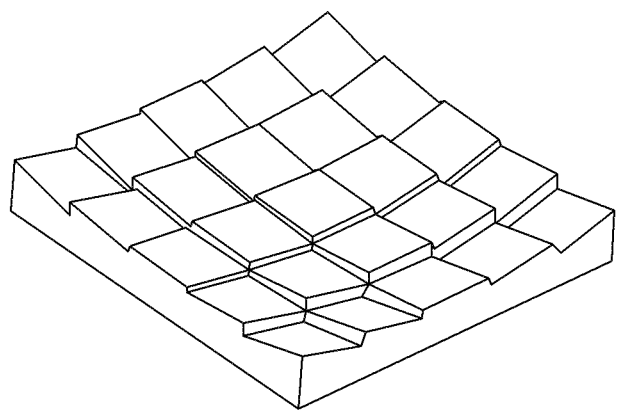
FIG. 8 is a schematic diagram of a beam guiding optical means 6 in the form of a lens, according to an embodiment of the disclosure.

FIG. 8 shows an example of an optical means 6 for guiding beam in the form of a lens with a field of view of 17×17 degrees and optical microlenses or lens microelements in the number of 25 (5×5), which are respectively responsible for directing one laser beam to a given point of the object; or the optical means for guiding beam can be made in the form of at least one microlens $6_1 \ldots 6n$ (see FIG. 2D) according to an embodiment of the disclosure.

The sensor device also includes at least one detector $7_1 \ldots 7n$ configured to detect the emitted laser radiation and connected via at least one transducer $8_1 \ldots 8n$ to the main controller 9 including the data processor. According to FIG. 2A (as one embodiment), the sources $1_1 \ldots 1n$ of laser radiation form a two-dimensional matrix of emitters, the collimating optics $3_1 \ldots 3n$ form a two-dimensional matrix of microlenses, and the detectors $7_1 \ldots 7n$ form a two-dimensional matrix of detectors.

Figure 2B:
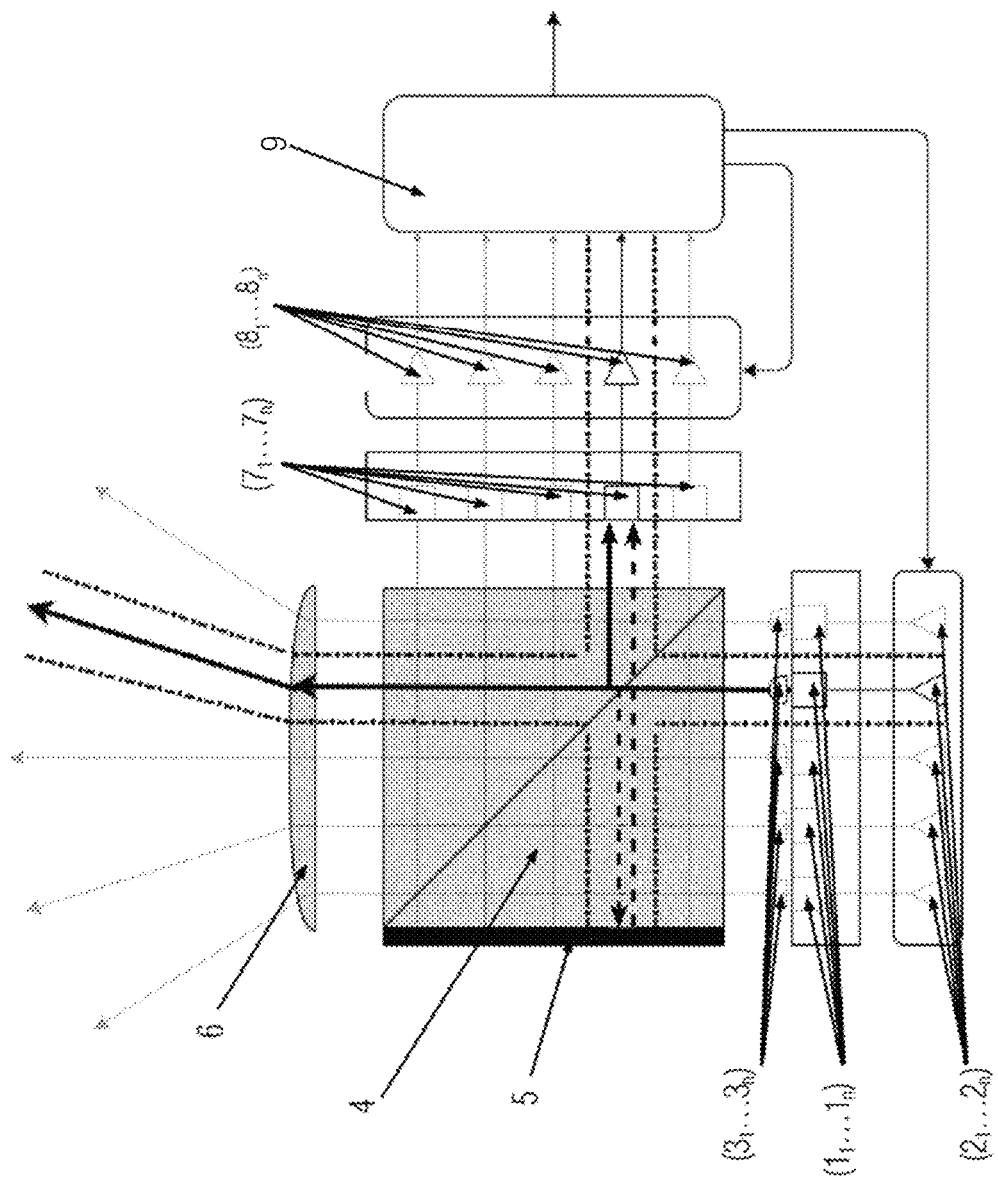
FIG. 2B illustrates a schematic diagram of an optical sensor device for determining distance and velocity of objects and identifying the shapes and structures of the objects by using a dedicated channel formed by a pair of a laser radiation source and a detector, according to an embodiment of the disclosure.

FIG. 2B shows a configuration of the optical sensor device for determining distance and velocity of objects and identifying the shapes and structures of the objects according to an embodiment of the disclosure.

Referring to FIG. 2B, one measuring channel is highlighted by a dash-dotted line, formed by a pair of one of the sources $1_1 \ldots 1n$ of laser radiation and one of the detectors $7_1 \ldots 7n$. The respective sources $1_1 \ldots 1n$ of laser radiation with a corresponding driver from drivers $2_1 \ldots 2n$ and the respective detectors from detectors $7_1 \ldots 7n$ with a corresponding converter from converters $8_1 \ldots 8n$ form an individually functioning and individually adjustable working channel, while all of these channels can work simultaneously or selectively, depending on the control signal from the main controller 9.

Figure 2C:
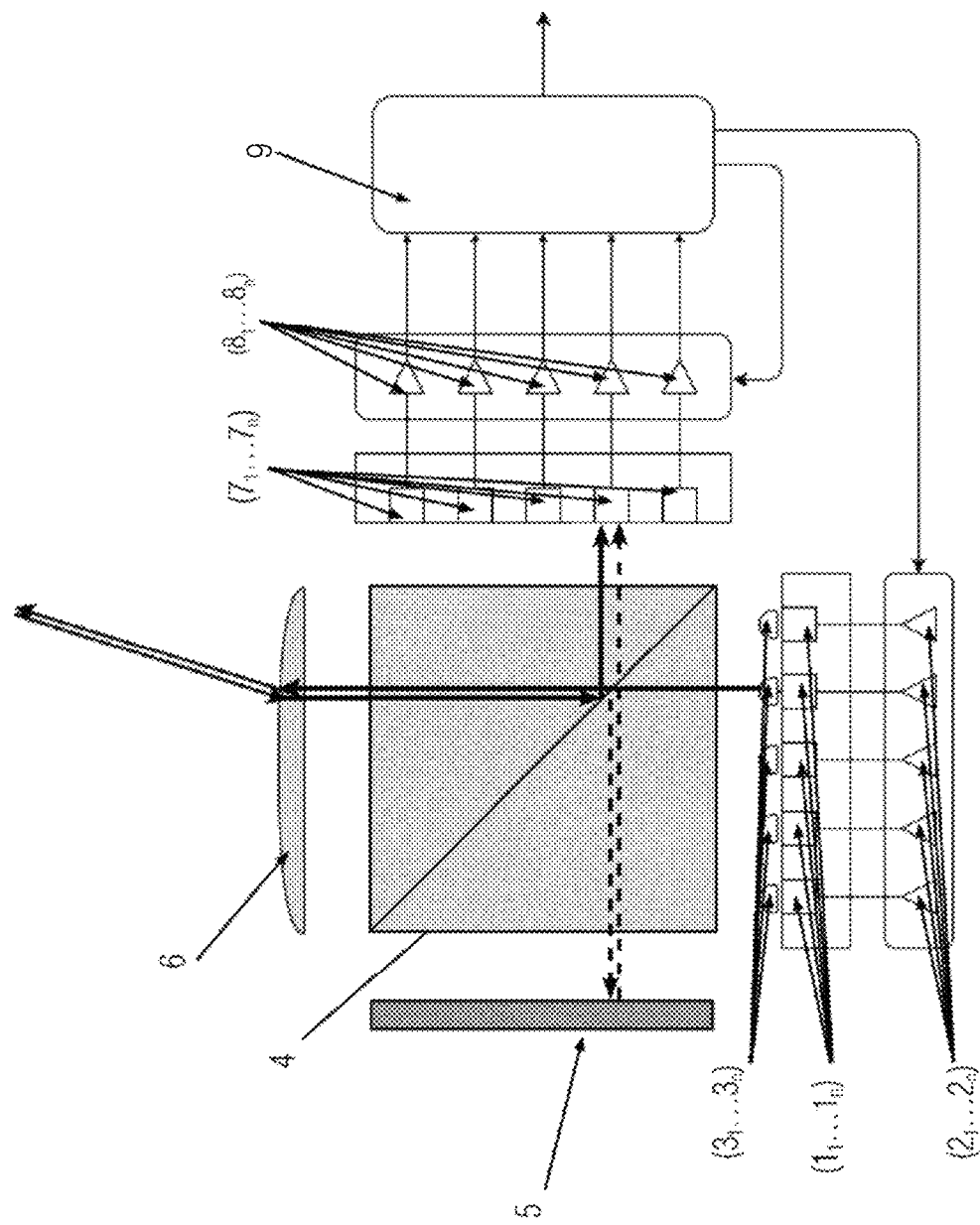
FIG. 2C illustrates a schematic diagram of the optical sensing device for determining distance and velocity of objects and identifying the shapes and structures of the objects according to an embodiment of the disclosure.

FIG. 2C shows a configuration of the sensor device, which completely repeats the configuration of the sensor device according to FIGS. 2A and 2B according to an embodiment of the disclosure, Referring to FIG. 2C, except for the location of the mirror 5, which is not on the side edge of the beam-splitting cube 4, but is placed in front of its lateral edge. In this case, the operation of the sensor device according to FIG. 2C completely repeats the operation of the device according to FIGS. 2A and 2B.

Figure 2D:
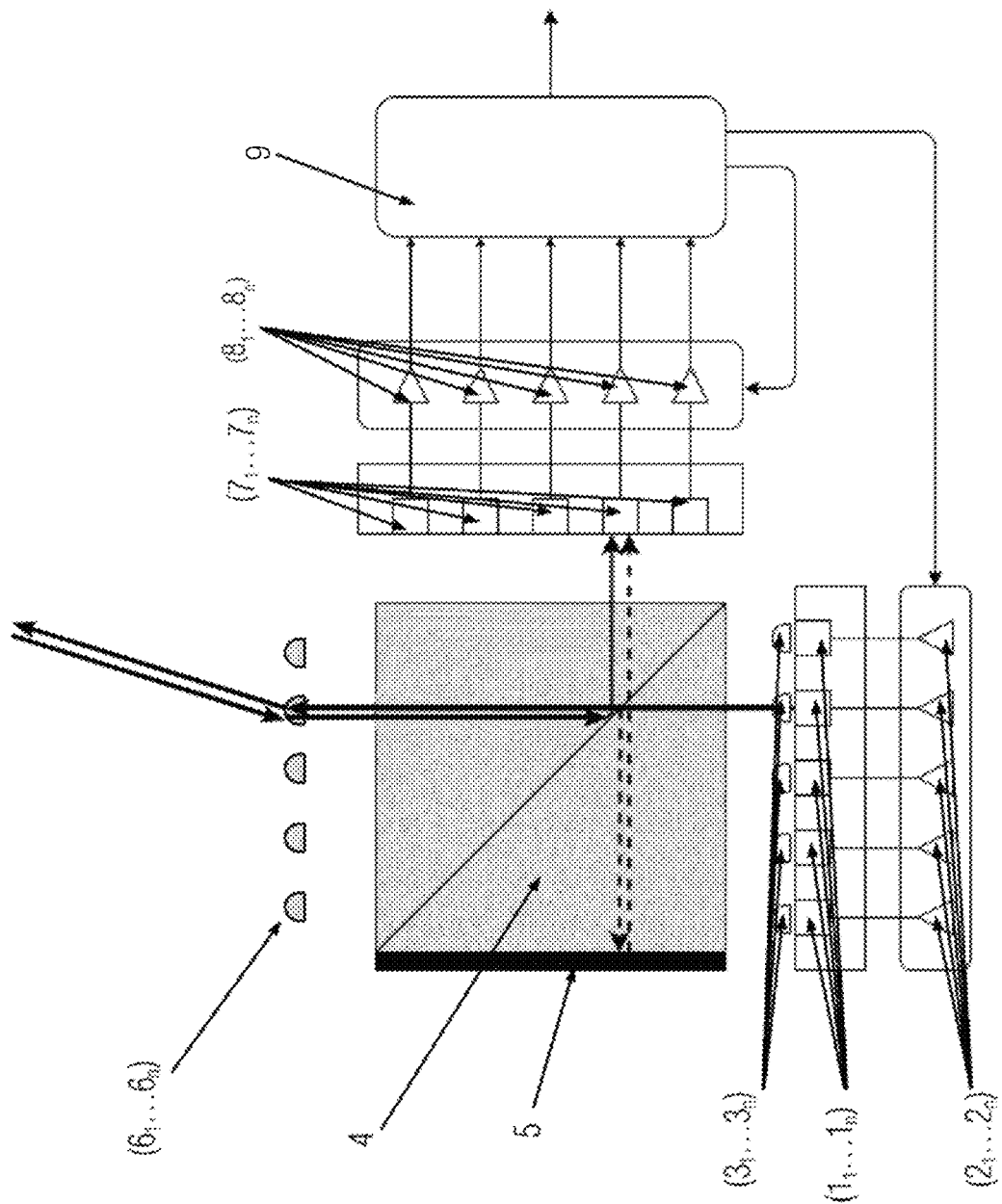
FIG. 2D illustrates a schematic diagram of the optical sensing device for determining distance and velocity of objects and identifying the shapes and structures of the objects according to an embodiment of the disclosure.

FIG. 2D shows a configuration of the sensor device, which completely repeats the configuration of the sensor device according to FIGS. 2A and 2B according to an embodiment of the disclosure.

Referring to FIG. 2D, except for the implementation of the optical means 6 for guiding the beam, which is a matrix of microlenses $6_1 \ldots 6n$, while the respective microlenses $6_1 \ldots 6n$ provide directing the laser beam to a given point of the object. The operation of the sensor device according to FIG. 2D completely repeats the operation of the device according to FIGS. 2A and 2B.

FIG. 2E shows a configuration of the sensor device, which completely repeats the configuration of the sensor device according to FIGS. 2A and 2B according to an embodiment of the disclosure.

Referring to FIG. 2E, except for an optical isolator 10 added to the circuit, which is an optical element that ensures the passage of the laser beam in only one direction, namely from the laser radiation source 1 to the beam-splitting means 4, and is located between the beam-splitting means 4 and the at least one optical collimating means $3_1 \ldots 3n$, and is configured to prevent the light reflected from the object from entering at least one laser radiation source $1_1 \ldots 1n$ and to prevent destabilization of the functioning of these laser radiation sources. The operation of the sensor device according to FIG. 2E completely repeats the operation of the device according to FIGS. 2A and 2B.

Figure 2F:
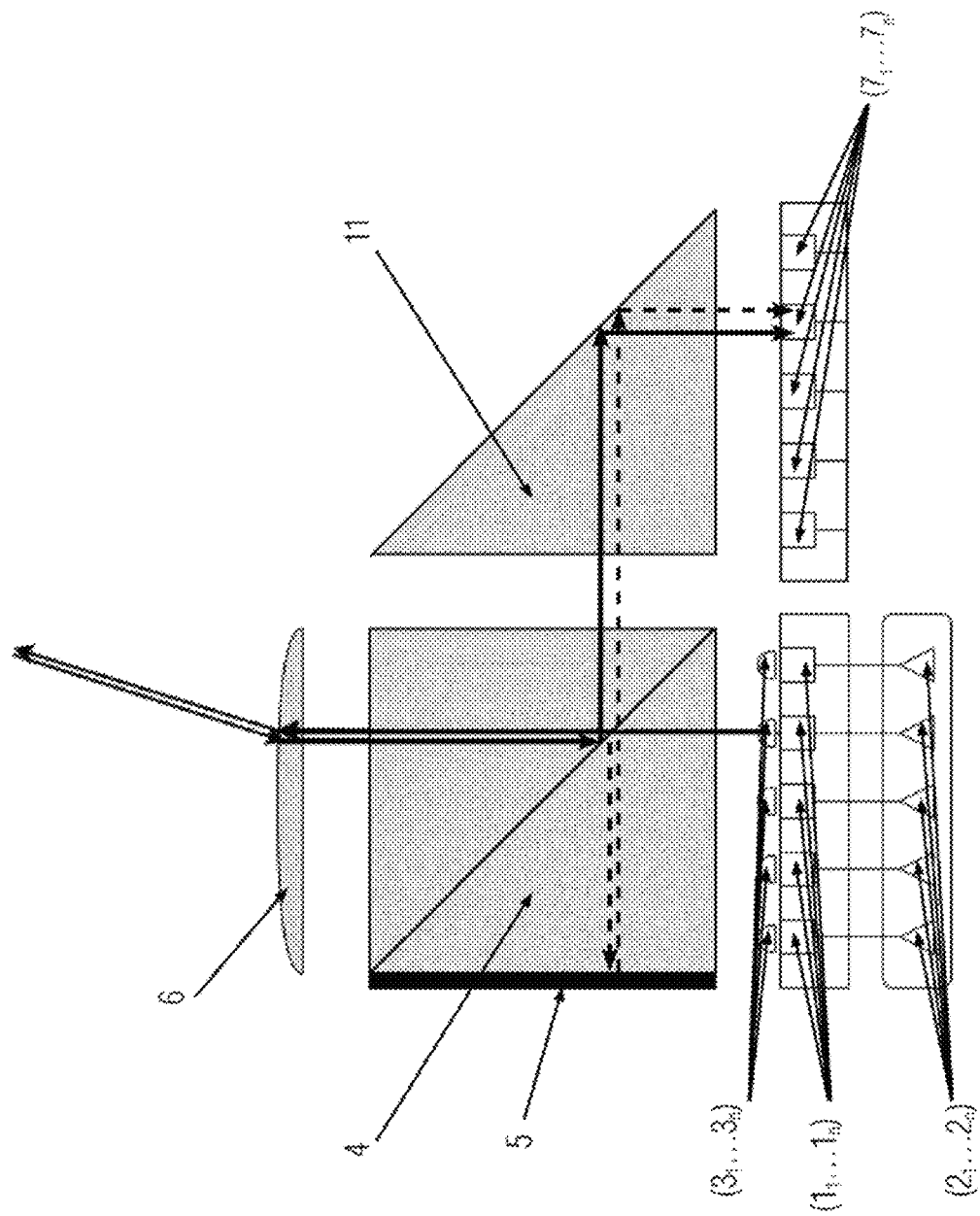
FIG. 2F illustrates a schematic diagram of the optical sensing device for determining distance and velocity of objects and identifying the shapes and structures of the objects according to an embodiment of the disclosure.

FIG. 2F shows a configuration of the sensor device, which completely repeats the configuration of the sensor device according to FIGS. 2A and 2B according to an embodiment of the disclosure Referring to FIG. 2F, only a prism $1_1$ is introduced into the configuration, due to which the reference and measuring beams, after leaving the beam-splitting cube 4, fall on the prism $1_1$ and are redirected after being reflected from its inner surface to the corresponding detector $7_1 \ldots 7n$. Due to such a trajectory of the beam passage, a more optimal arrangement of the elements of the sensor device is provided, which makes it possible to place sources $1i \ldots 1n$ of laser radiation with drivers $2_1 \ldots 2n$ and detectors $7_1 \ldots 7n$ on a single chip. This arrangement of the sensor device on a single chip allows a significant reduction in the size of the sensor device, which plays a decisive role in its use in mobile touch devices. A part of the configuration illustrating the converters and the main controller is omitted in FIG. 2F, but the sensor device completely repeats the sensor device shown in FIGS. 2A and 2B. The operation of the sensor device according to FIG. 2F completely repeats the operation of the device according to FIGS. 2A and 2B.

It should be noted that all optical elements, i.e., the laser radiation sources, the collimating means, the beam-splitting means, the optical means for guiding the beam, the detectors and other optical elements included in the sensor device and shown in FIGS. 2A to 2F are optically coupled to each other.

The sensor device according to the disclosure (see FIGS. 2A to 2F) operates as follows.

Laser radiation with a predetermined wavelength (700-950 nm) is emitted by at least one of the laser radiation sources $1_1 \ldots 1n$, passes through at least one of the collimating microlenses $3_1 \ldots 3n$, and falls on the beam-splitting cube 4, where a part of the radiation, i.e., the reference beam (indicated by the dotted line in FIGS. 2A to 2F) is reflected from the semitransparent mirror (not shown) inside the beam-splitting cube 4 and falls on the reflecting surface 5 (FIG. 2A) or the mirror 5 (see FIG. 2C) of the beam-splitting cube 4, and is reflected therefrom and falls on the corresponding at least one detector $7_1 \ldots 7n$. Then, the second part of the radiation, i.e., the measuring beam (indicated by the solid line in FIGS. 2A to 2F) passes through the beam-splitting cube 4 and falls on the optical means 6 guiding the beam, which is configured to be capable of directing the specified measuring beam at a given angle to the object under study. The reflected measuring beam, reflected from the object, passes the beam guiding means 6 and the beam-splitting cube 4 and enters the corresponding detector from the detectors $7_1 \ldots 7n$, where the frequency difference $\Delta\omega$ of two signals formed by the reference beam and the measuring beam is measured, according to the heterodyne measurement method described above.

The sensor device according to the disclosure (FIGS. 2A to 2F) ensures the operation of the individual pair forming the measuring channel, for example, the laser radiation source $1i$(emitter) and the detector $7_1$ in a fixed direction towards the point of the object. Thus, the object under study is scanned simultaneously, and the individual pair, i.e., the emitter—the detector is aimed at one of its specific points located on the object, and accordingly, the sensor device covers the entire field of view. The individual measuring channel formed by the corresponding pair of the emitter and the detector (see FIG. 2B, highlighted by a dash-dotted line) operates independently of other channels, but at the same time, the process of scanning the object by the sources $1_1 \ldots 1n$ of laser radiation and the detectors $7_1 \ldots 7n$ is executed simultaneously. Due to this configuration of the sensor device, the distance to the object and the velocity of the object (objects) are measured at the same time (t), which increases the accuracy of the high operation speed of the sensor device and the obtained parameters according to the disclosure.

Figure 3A:
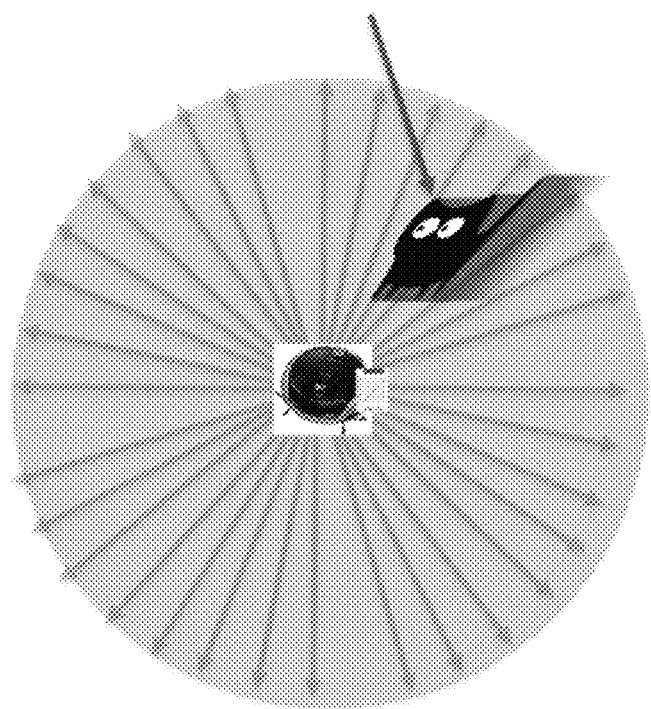
FIG. 3A illustrates an example of an image generated by scanning performed by prior art ranging devices (LIDARs) based on the time-of-flight principle of determining the distance to an object according to an embodiment of the disclosure.

FIG. 3A illustrates an example of an image generated by scanning performed by prior art ranging devices (i.e., LIDARs) based on the time-of-flight principle of determining the distance to an object according to an embodiment of the disclosure.

Figure 3B:
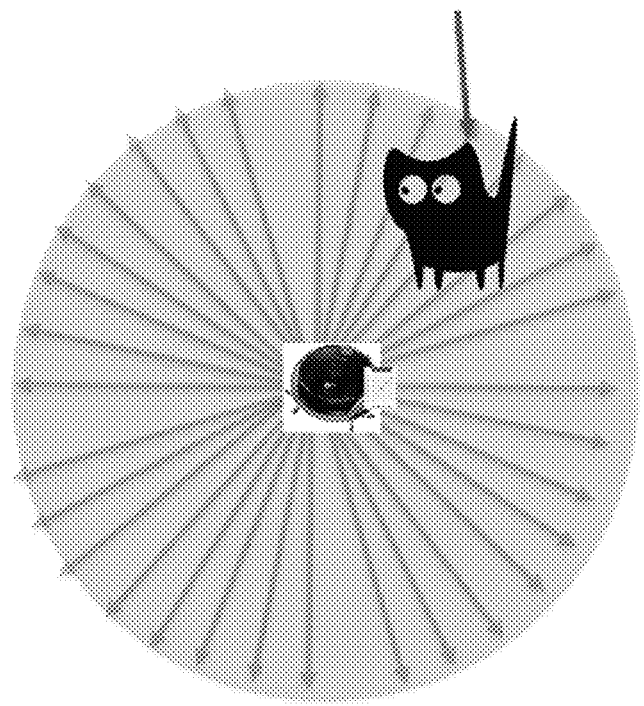
FIG. 3B illustrates an example of an image generated by the optical sensing device for determining distance and velocity of objects and identifying the shapes and structures of the objects according to an embodiment of the disclosure.

FIG. 3B illustrates an example of an image generated by the optical sensing device for determining distance and velocity of objects and identifying the shapes and structures of the objects according to an embodiment of the disclosure.

Referring to FIGS. 3A and 3B, due to this, the effect of fuzziness or blurring of the image of a moving object does not occur, since the distance to the object is measured at the same time, in contrast to traditional distance measuring devices (i.e., LIDARs), where, during scanning of an object, the respective subsequent points of the object, where the beam falls, are displaced by $\Delta t$ and distance $\Delta s$, which causes the appearance of distortions in the image of the object, which is clearly seen in FIG. 3A showing a slightly distorted image of an object in the form of a black cat. FIG. 3B shows a clear image since all points of the object are scanned simultaneously across the entire field of view. The high speed of operation of the claimed sensor device is ensured as measurements are conducted in the entire field of view simultaneously and there is an absence of mechanical rotating parts that limit the speed in traditional LIDARs.

The operation of the optical sensor device for determining distance and velocity of objects and identifying the shapes and structures of the objects according to the disclosure is based on the principle of frequency modulated continuous radiation (FMCW), which allows adjusting the length resolution "on fly", i.e., during the operation of the sensor device, without making structural changes directly to the device itself, but only by changing the operating parameters of the laser radiation sources $1_1 \ldots 1n$, namely the current supplied to the laser radiation sources $1_1 \ldots 1n$ through the drivers $2_1 \ldots 2n$ according to a signal from the main controller 9.

One of the parameters determined by the claimed sensor device is the operational resolution (Res) in terms of range.

At the same time, the inventors carried out experimental studies wherein, in the sensor device according to the disclosure, the amplitude of modulation of the pump current supplied to the laser radiation sources $1_1 \ldots 1n$ was 3 mA (the pump current varied from 3 mA to 6 mA), while the range resolution was 0.25 mm, and in case the current modulation amplitude was 1 mA (the pump current varied from 4 mA to 5 mA), the range resolution was 0.75 mm. In both cases, a change in the value of the current supplied to the laser radiation sources made it possible to adjust the resolution in terms of the distance to the object. The wavelength of the laser radiation sources was 850 nm.

Similar studies were carried out at a wavelength of laser sources equal to 780 nm. In this case, the amplitude of modulation of the pump current supplied to the laser radiation sources $1_1 \ldots 1n$ was 40 mA (the pump current varied from 80 mA to 120 mA), while the range resolution was 6 mm, and in case the modulation amplitude was 10 mA (the current pumping ratio varied from 100 mA to 110 mA), the range resolution was 25 mm. In both cases, a change in the value of the current supplied to the laser radiation sources made it possible to adjust the resolution in terms of the distance to the object.

Range resolution (Res) can be calculated as follows:

$$Res = \frac{c}{2\Omega dI} \quad \text{Equation 6}$$

where: c is the speed of light (m/s), $\Omega$ is the dependence of the frequency of the emitted laser light depending on the current pumped into at least one laser radiation source $1_1 \ldots 1n$ (hereinafter, referred to as a laser) (Hz/mA), and dI is the amplitude of the modulation of the current of the laser radiation source during the scanning of the object (mA) (i.e., the current tuning of the laser radiation source during the scanning of the object).

By changing the amplitude of the modulation of the current (dI) in the process of scanning an object, it is possible to change the range resolution promptly.

Figure 4A:
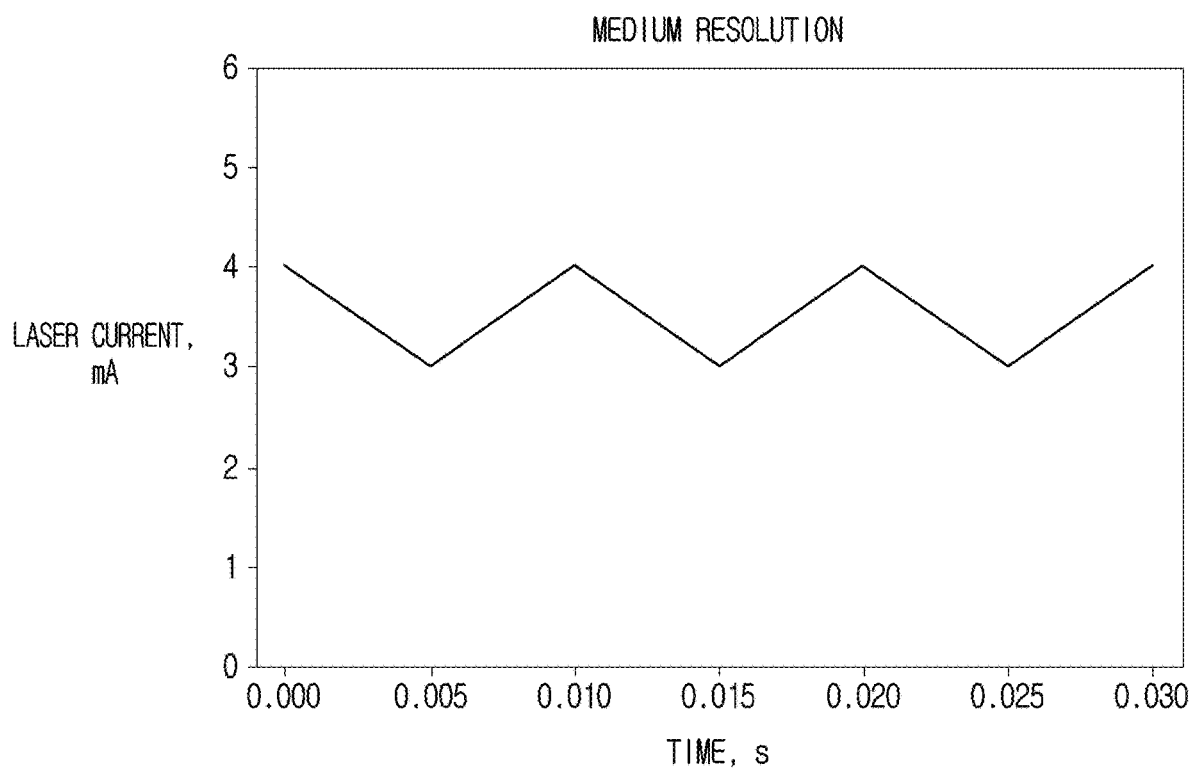
FIG. 4A is a graph illustrating the dependence of the pump current of the laser source on time for medium range resolution according to an embodiment of the disclosure.
Figure 4B:
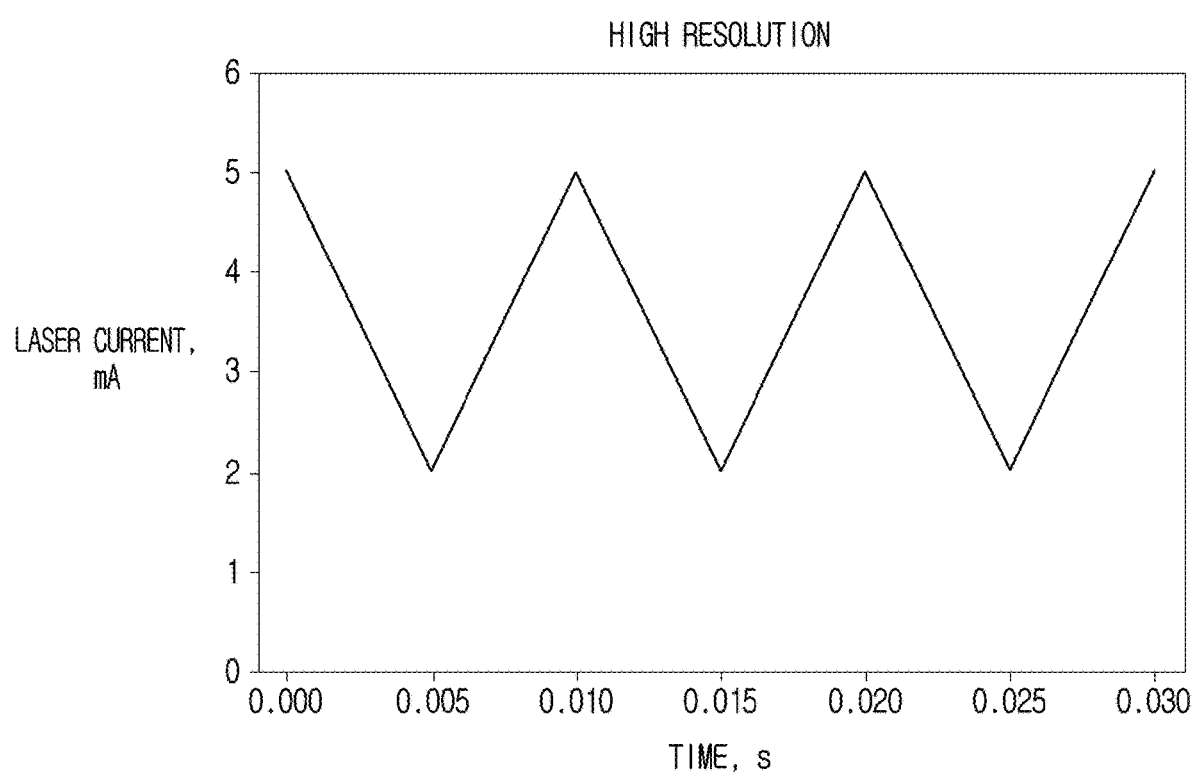
FIG. 4B is a graph illustrating the dependence of the pump current of the laser source on time for high range resolution according to an embodiment of the disclosure.

FIGS. 4A and 4B are graphs illustrating the dependence of the length resolution on the current according to various embodiments of the disclosure.

Figure 5A:
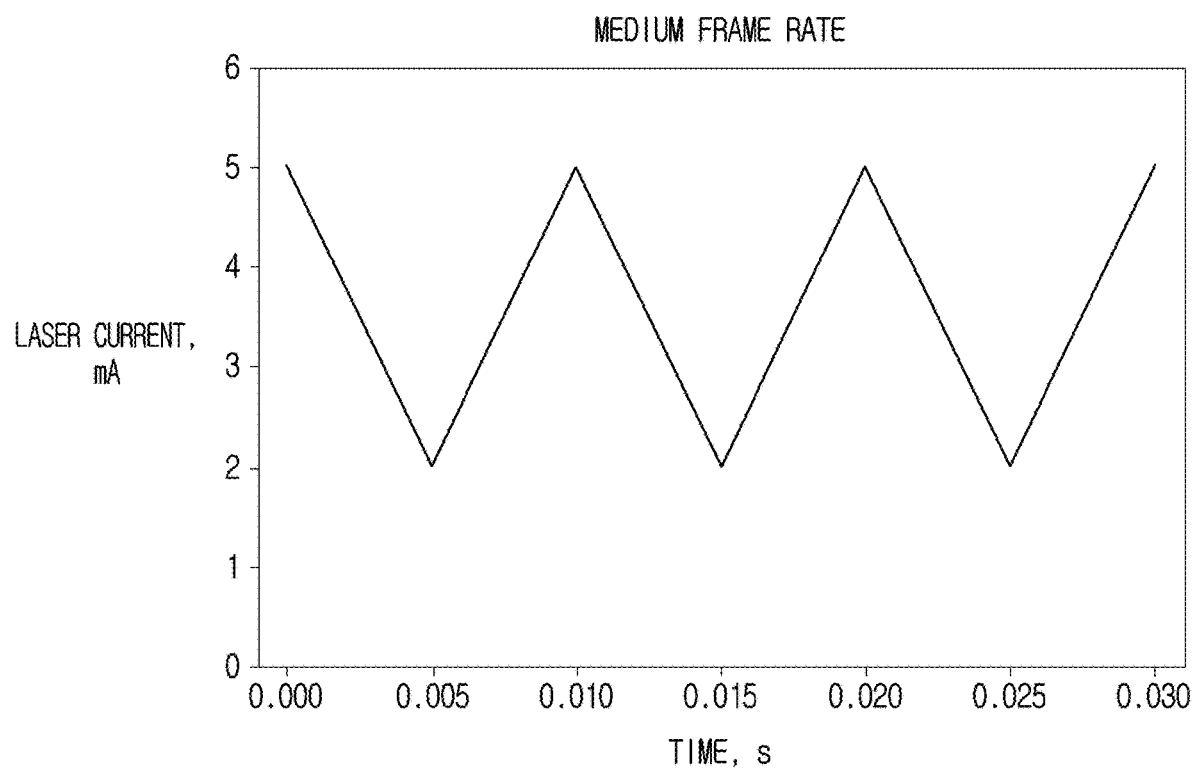
FIG. 5A is a graph illustrating the dependence of the pump current of the laser source on time for an average frame rate according to an embodiment of the disclosure.
Figure 5B:
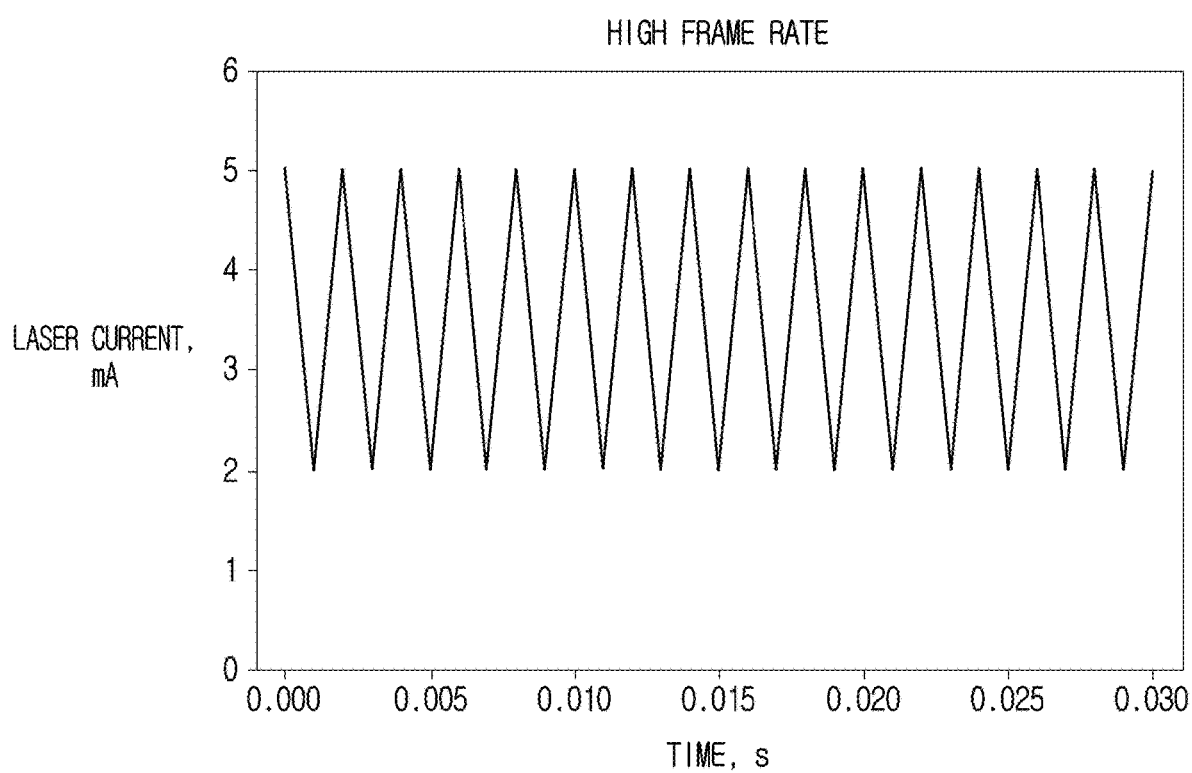
FIG. 5B is a graph illustrating the dependence of the pump current of the laser source on time for a high frame rate according to an embodiment of the disclosure.

FIGS. 5A and 5B show graphs illustrating the dependence of the frame rate on the laser pump current for cases of high and medium frame rates (i.e., the number of measurements per unit of time) according to various embodiments of the disclosure.

Referring to FIGS. 4A and 4B, FIG. 4A shows the dependence of the pump current of the laser radiation source (laser) on time at which the average resolution of the distance determination (about 3 mm) is realized, and FIG. 4B shows the dependence of the pump current of the laser radiation source (laser) on time at which a high resolution of the distance determination is realized (about 0.25 mm).

Referring to FIGS. 5A and 5B, FIG. 5A shows the average scanning speed, and FIG. 5B shows the high scanning speed. The ordinate indicates the current value supplied to the laser source (mA), and the abscissa indicates the time (sec), and one period corresponds to one measurement. It can be seen from these graphs that the faster the signal is repeated, the higher the frame rate is. The higher the signal amplitude (i.e., the swing between the minimum and maximum), the higher is the accuracy in determining the distance.

Since the claimed sensor device is based on the principle of frequency modulation continuous radiation (FMCW), in addition to determining the distance to the object, it can identify the parameters of the object itself, since the claimed sensor device is capable of determining data of distribution of the reflection coefficients depending on the surface structure of the object.

Traditional optical ranging devices (LIDARs) based on the time-of-flight principle as "raw", i.e., of unprocessed data, return one point in respective directions, and the point corresponds to the time of flight of the light to the object, from which the light was reflected back into the LIDAR. In contrast to traditional time-of-flight LIDARs, the claimed device provides information about the distribution of the reflection coefficient for the respective beams, depending on the distance reflected from the object, as "raw" (unprocessed) data.

FIGS. 6A and 6B are graphs that clearly demonstrates this principle of operation according to various embodiments of the disclosure.

Referring to FIGS. 6A and 6B, the arrangement of transparent and opaque objects along the path of the beam emitted by the laser radiation source (laser), and the distribution of reflectance obtained when a laser beam passes through transparent or opaque objects are illustrated.

As seen in FIGS. 6A and 6B, two transparent windows (glass plates) are located on the path of the laser beam, and there is a sufficiently extended opaque object, for example, a wall.

The laser beam emitted from the laser radiation source $1_1 \ldots 1n$ (laser) passes through two transparent windows (two thin glass plates) located along the path of the beam, and the plates transmit most of the radiation (about 90%), and a small part radiation (5-10%) is scattered or reflected when passing through the transparent objects. Accordingly, FIGS. 6A and 6B show the two small peaks characteristic of a beam reflected from transparent objects and one large peak characteristic of a beam almost completely reflected from a wall. As can be seen from the graph, the peak amplitudes are proportional to the reflection coefficient of the light signal (since reflections from objects at different distances will lead to a signal from the photodetector at different frequencies that can be easily distinguished according to the equation 4).

Thus, according to these graphs, one can judge the type of objects located in the path of the beam from the laser radiation source, i.e., two small peaks (a small reflection from a transparent object (glass)) and one large peak (a large reflection from an opaque object (wall)).

Further, when the signal is converted from frequency to distance (i.e., in meters), one can conclude that there are two objects along the beam that reflect little light back into the sensor device, and behind them, there is one object with a high reflection coefficient (large peak) of light from this object (i.e., wall) back to the device.

Thus, such a function of the sensor device according to the disclosure will improve the quality of navigation inside a house or other space, since classical time-of-flight LIDARs are only able to recognize highly reflective objects and are not able to distinguish objects with a low reflectivity (transparent or translucent objects).

The claimed sensor device is also capable of recognizing or identifying characteristic features of the surfaces of transparent and opaque objects through which a beam emitted from at least one laser radiation source $1_1 \ldots 1n$ propagates and/or is reflected. The recognition or identification of the structure or material of the object can be performed based on the distribution of the reflection coefficients along the beam path.

Figures 7A, 7B, 7C:
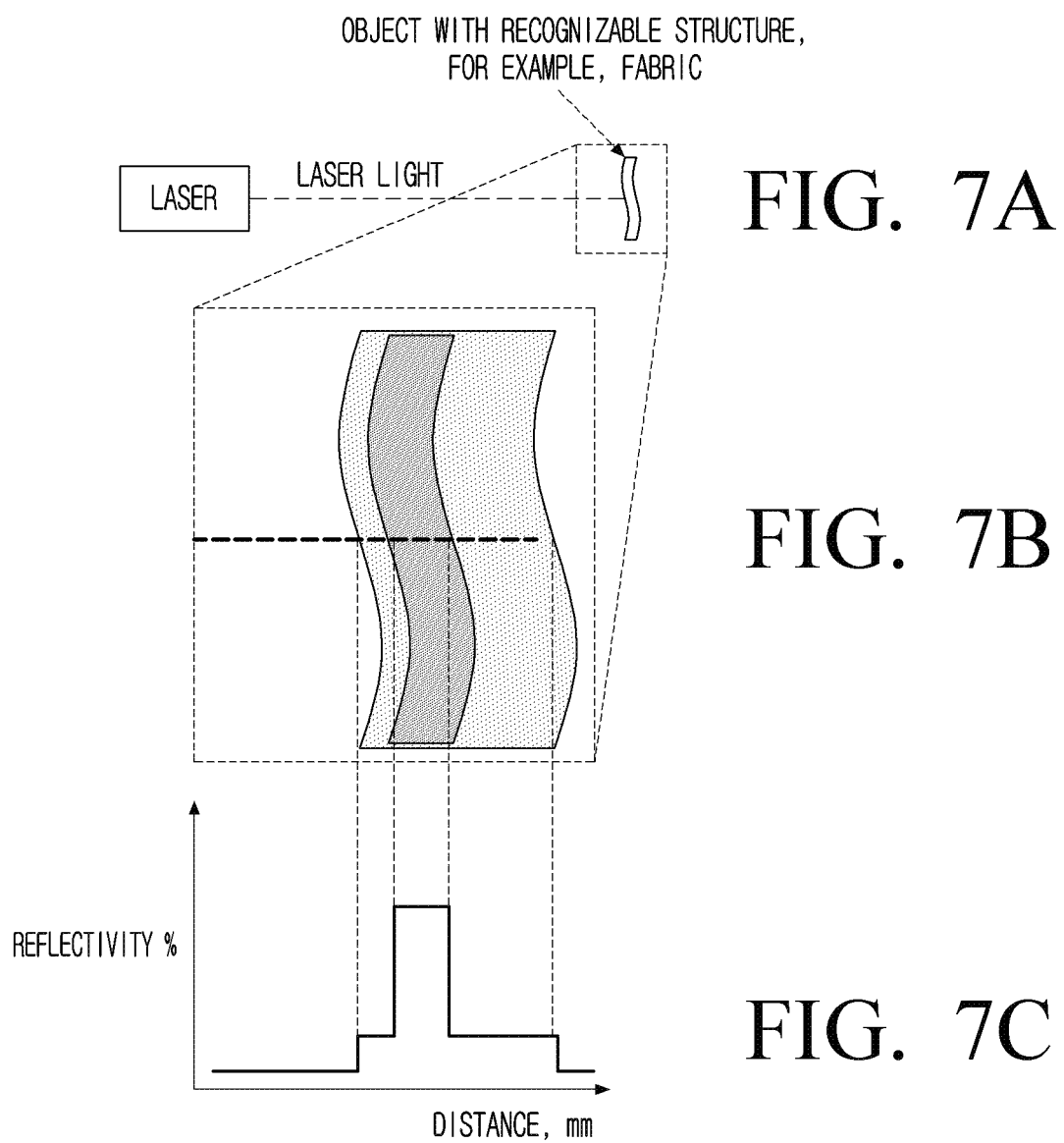
FIGS. 7A, 7B, and 7C illustrate diagrams of the distribution of the reflection coefficient along the path of the laser beam, corresponding to an example of a location of an object representing a fabric, a fabric structure with a denser "layer" inside, and an example of a location of an object which is a fabric according to various embodiments of the disclosure.

FIGS. 7A, 7B, and 7C are diagrams of an example of an arrangement of a tissue object, a fabric structure with a denser "layer" within the fabric, and the distribution of the reflection coefficient along the path of the laser beam, corresponding to an example of a location of the object which is the tissue according to various embodiments of the disclosure.

Referring to FIGS. 7A, 7B and 7C, the upper diagram in each figure is a diagram illustrating the propagation of a beam emitted from at least one laser radiation source $1_1 \ldots 1n$ (laser) through a sufficiently extended object (e.g., tissue) along the path of the beam propagation. In this case, the layer-by-layer separation of a piece of fabric is clearly shown in the middle diagram in FIGS. 7A, 7B, and 7C, and the respective layers of the object contribute to the reflection along the length. In this case, a useful signal transmitted and/or reflected from the object repeats the pattern of reflection or scattering of the object. In general, the respective layers of the object material will reflect the beam that represents a signal indicative of the reflectivity along the path of the beam, which can be clearly seen in the lower diagram in FIGS. 7A, 7B, and 7C, where a higher peak corresponds to a higher reflectivity of the inner tissue layer.

Thus, one can judge the nature of the material from which the object is made by the distribution of the reflectivity of the object.

Highly reflective objects, such as concrete walls, metal objects, etc., reflect almost 100% of the light from their surfaces, resulting in a narrow peak in the signal spectrum.

Low-reflective objects, such as glass, leather, fabric, etc., reflect some of the light from the surface, and more light is reflected from the subsurface as the light enters the material. This produces a wide, uneven peak. By analyzing the shape of the peak, i.e., width and height, one can estimate the type of material of the extended object. This fact is clearly illustrated in the graph in the lower diagram in FIGS. 7A, 7B, and 7C, which characterizes the distribution of the reflectance of the signal reflected from the tissue.

Thus, the claimed sensor device is configured to provide a high-resolution image of a moving object in combination with the detection of multiple reflections along the path of the beam, which makes it possible to differentiate the target object depending on how the target objects reflect the beam from the laser source.

The inventors conducted a number of experimental studies and classified the patterns of the distribution of the reflectivity of some target objects (glass, concrete (brick), fabric (tissue)). Thus, by the profile of the peaks characteristic of the reflection signal for different materials of objects, it is possible to recognize the materials from which the objects are made and their shapes.

FIGS. 9A, 9B, 9C, and 9D are graphs illustrating the distribution of reflectivity depending on the materials of objects (plastic, leather, fabric, glass), where the ordinate denotes (in arbitrary units) the reflectivity (reflection), and the abscissa is the distance in mm (i.e., the distance from the sensor device to the object, which was approximately 150 mm during the experiment).

Figure 9A:
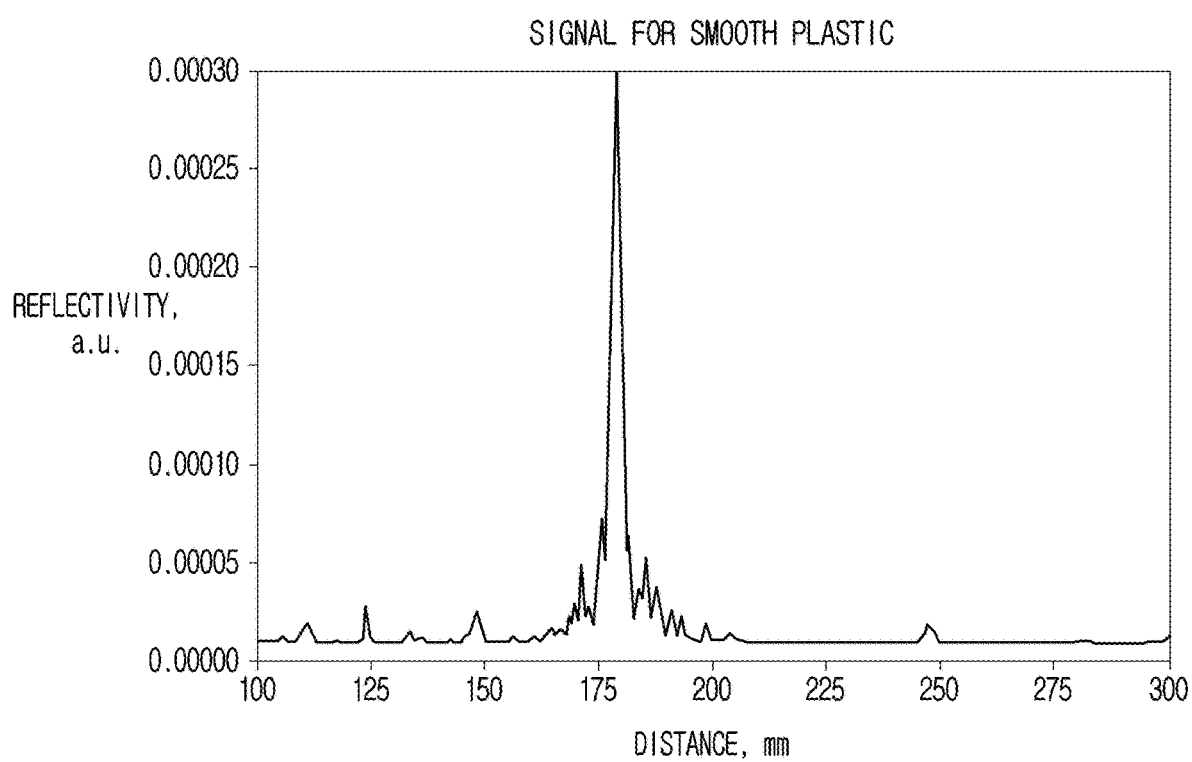
FIG. 9A is a graph illustrating a signal obtained when using a plastic plate as an object according to an embodiment of the disclosure.

FIG. 9A is a graph illustrating a signal obtained using a plastic plate as an object, and the graph shows a large height of the signal peak and a small width according to an embodiment of the disclosure.

Figure 9B:
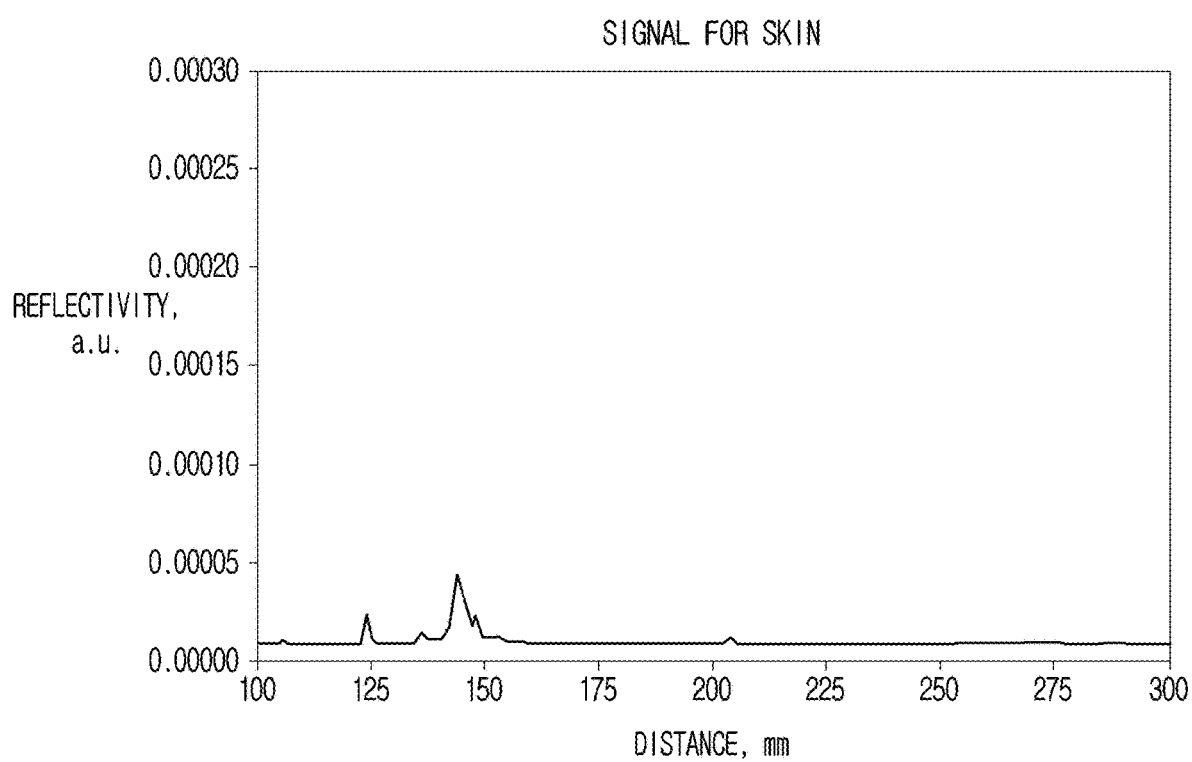
FIG. 9B is a graph illustrating a signal obtained when using a human palm as an object according to an embodiment of the disclosure.

FIG. 9B is a graph illustrating a signal obtained using human palm skin as an object. One can see on the graph a low height of the structure peak (the flatter part of the peak on the right, indicating the penetration of light under the surface and reflected from the deep layers of the object), and a significant width according to an embodiment of the disclosure.

Figure 9C:
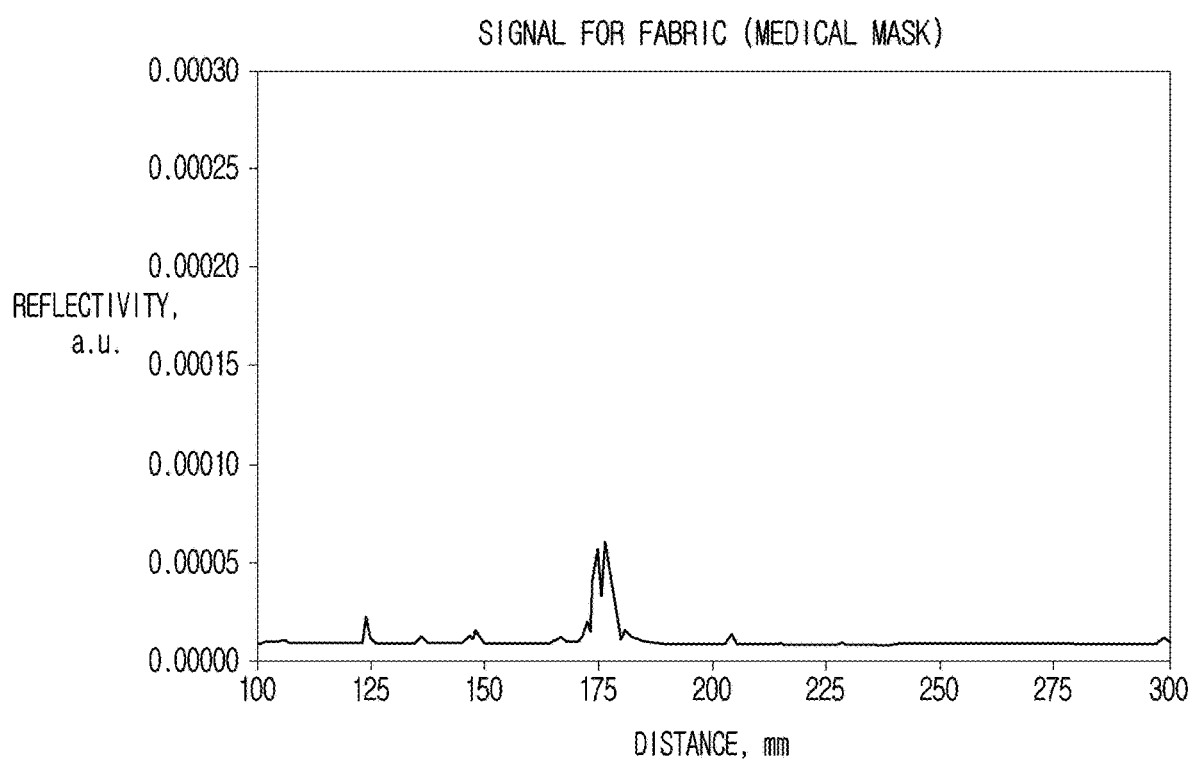
FIG. 9C is a graph illustrating a signal obtained when using a protective mask fabric as an object according to an embodiment of the disclosure.

FIG. 9C is a graph illustrating a signal obtained using a tissue (medical mask) as an object. One can see in the graph a low peak height, a peak structure (it consists of two adjacent maxima) and a significant width according to an embodiment of the disclosure.

Figure 9D:
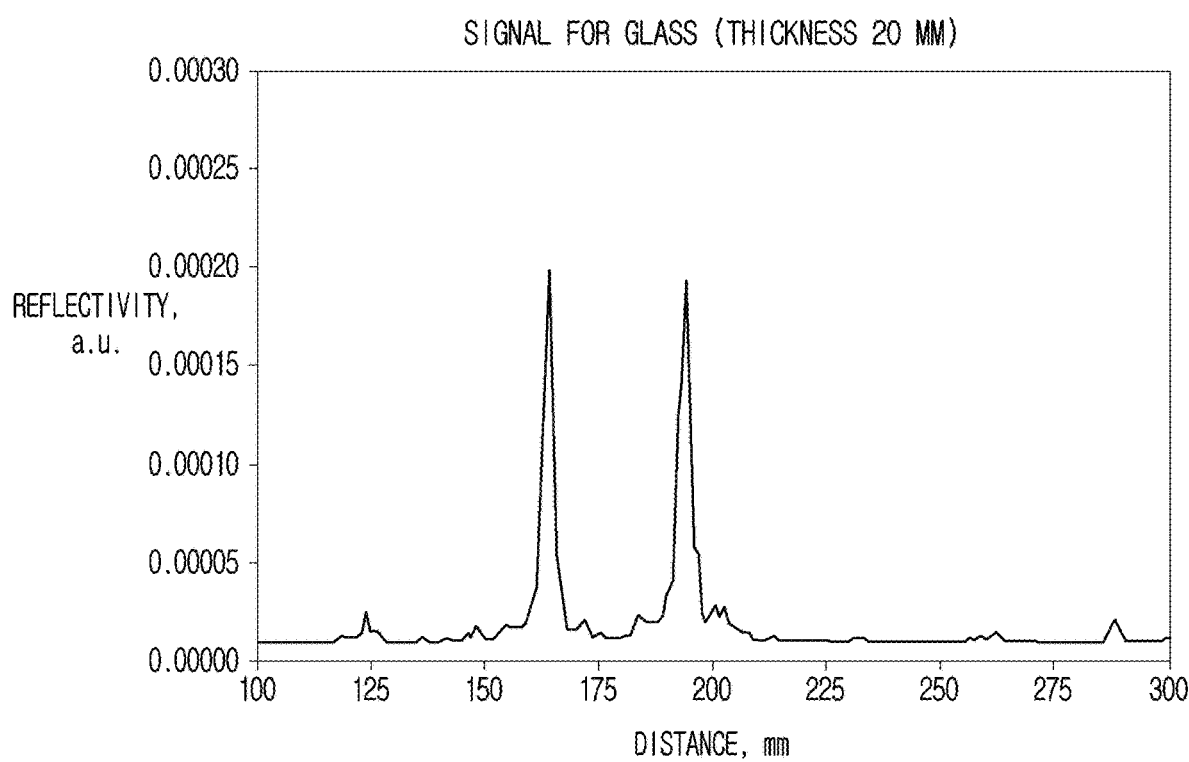
FIG. 9D is a graph illustrating a signal obtained when using a glass plate as an object according to an embodiment of the disclosure.

FIG. 9D is a graph illustrating a signal obtained using a 20 mm thick glass plate as an object. One can notice in the graph a large peak height, a small width and a presence of two peaks (this clearly indicates reflection from two surfaces located one after the other—in this case, from the front and rear surfaces of the glass plate) according to an embodiment of the disclosure.

Referring to FIGS. 9A, 9B, 9C and 9D, the experimental data presented in the form of graphs clearly illustrate the significant differences in the waveforms depending on the material (structure) of the reflecting object. The waveform can be used as input data for the material type recognition algorithm.

The obtained experimental data is used to set up a machine learning algorithm designed to classify the results of the response data obtained on the detectors $7_1 \ldots 7n$ and inputted into the main controller 9 (hereinafter, referred to as the controller), where the classification of the received response data from the object is carried out based on the preset algorithm of the main controller 9, and the result about the structure and shape of the object is displayed on the basis of the classification.

The claimed sensor device is also configured to measure the velocity of the respective points of the object, which is measured simultaneously with the distance to the object, in contrast to the LIDARs known from the prior art where the velocity is determined based on the location of objects in two subsequent frames (in this case, the "frame" meant one measurement of distances to an object in the field of view of the device, performed simultaneously).

As an object moves, the light reflected from it experiences a frequency shift due to the Doppler Effect. This shift is described by the following equation:

$$\delta\omega = \omega_0 \frac{v}{c} \qquad \text{Equation 7}$$

where ω0 is the frequency of the incident light (Hz), V is the speed of the object (m/s), and c is the speed of light (m/s).

Thus, the frequency difference between the laser radiation source and the measuring signal is equal to:

$$\Delta\omega = \frac{2L}{c}\alpha + \omega_0 \frac{v}{c} \qquad \text{Equation 8}$$

where $\omega_0$ is the frequency of the incident light (Hz), V is the velocity of the object (m/s), c is the speed of light (m/s), L is the distance to the object (m), a is the rate of rise of the radiation frequency (Hz/s), i.e., the rate of measurement of the instantaneous frequency of the laser radiation emitted by the source (laser).

For example, if a laser changes its wavelength from 852 nm (frequency=352.1 THz) to 850 nm (frequency=352.9 THz) in a time of 0.1 seconds, the rate of rise of frequency is equal to:

$$\alpha = \frac{352.9 - 352.1}{0.1} = 8 \frac{THz}{\sec}.$$

It can be seen from (8) that the measured frequency of the photodetector signal is influenced by both the distance (L) to the object and the velocity of the object (V). To be able to separately measure the velocity and distance to the object, it is proposed to carry out two measurements sequentially one after the other: first, when the rate of rise of frequency is equal to a, and then—when the rate of rise of frequency is equal to $-\alpha$. (i.e., the frequency falls over time).

In this case, during the rise in frequency, the frequency $\Delta\omega1$ will be measured:

$$\Delta\omega_1 = \frac{2L}{c}\alpha + \omega_0\frac{v}{c} \quad \text{Equation 9}$$

where $\Delta\omega1$ is the frequency difference of the signals generated by the measuring and reference beams as the radiation frequency increases (Hz), $\omega_0$ is the frequency of the incident light (Hz), V is the object's velocity (m/s), s is the speed of light (m/s), L is the distance to the object (m), and a is the rate of rise of the radiation frequency (Hz/s).

During the fall of the frequency, the frequency $\Delta w2$ will be measured:

$$\Delta\omega_2 = \frac{2L}{c}\alpha - \omega_0\frac{v}{c} \quad \text{Equation 10}$$

where $\Delta\omega_2$ is the difference between the frequencies of the signals generated by the measuring and reference beams as the radiation frequency decreases (Hz), $\omega_0$ is the frequency of the incident light (Hz), V is the object's velocity (m/s), s is the speed of light (m/s), L is the distance to the object (m), and a is the rate of rise of the radiation frequency (Hz/s).

Thus, the distance to the object L and its speed V can be calculated by the equations:

$$L = \frac{c(\Delta\omega_1 + \Delta\omega_2)}{4\alpha} \quad \text{Equation 11}$$

$$V = \frac{c(\Delta\omega_1 - \Delta\omega_2)}{2\omega_0}$$

These calculations can be performed in the main controller 9.

The claimed sensor device provides simultaneous measurement of the distance to the object, the speed of the object, as well as the shape and structure of the object, for example, the material from which the object is made.

The claimed device is a compact sensor designed for use in small robots and other household appliances (both inside and outside the home).

In addition, the claimed sensor device is characterized by high reliability, since its design does not cover the presence of moving mechanical parts or parts. As already indicated in the description, the operation of the sensor device is based on the interferometric method, which contributes to the possibility of operation of the claimed device both inside the house and outside the house next to sources of bright light and other LIDARs, since this interferometric method provides the detection of only light emitted by the sensor device itself and does not respond to other sources of radiation, such as bright lamps, the sun, the moon and other sources of radiation, i.e., has no problem with flares from other potential radiation sources.

The claimed sensor device makes it possible to determine both the distance to the object and its speed simultaneously, which allows the use of new algorithms for navigation. In addition, the claimed device allows obtaining data (an FMCW signal), which, after some processing, characterize the structure of the object.

In addition, the claimed sensor device provides an operational change in the laser modulation parameters of the sensor device. For example, to increase the frame rate, it is necessary to increase the frequency of modulation of the current (according to the signal from the main controller 9), and to improve the resolution, it is necessary to increase the amplitude of the modulation of the pump current (according to the signal from the main controller 9), which will lead to a greater amplitude of the wavelength modulation.

The specified capabilities of the sensor device according to the disclosure make it possible to quickly change the function of the device, for example, the sensor device can operate for navigation purposes when operating with a household vacuum cleaner, but if necessary, it is possible to easily rearrange the operation of the device for a small number of scanning points of the object, but with a higher resolution and high frequency frames, which ensures its operation as a gesture sensor. In this case, according to the control signal from the main controller 9, the number of simultaneously functioning sources of laser radiation is reduced (compared to the previous case), but the amplitude of modulation of the current supplied to these laser radiation sources $1_1 \ldots 1n$ is increased, which increases the image resolution of the object and the frame rate. In the case of an alternating mode of operation of the laser radiation sources $1_1 \ldots 1n$, the sensor device operates as a 3-dimensional scanner. Thus, the claimed device allows to quickly change its mode of operation depending on the user's task.

In general, the output from a sensor device is the distribution of light reflecting and scattering objects (with their shapes) in the surrounding space.

To operate in the gesture sensor mode, the sensor device can be switched to a mode with a higher frame rate (e.g., if the sensor device operates at 10 frames/see in the normal mode, it operates at 50 frames/see in the gesture sensor mode); with a higher resolution (e.g., if the sensor device operates with a resolution of 5 mm in the normal mode, it operates with a resolution of 0.2 mm in the gesture sensor mode); and with a narrower field of view (e.g., if the touch device operates with a field of view of 50° in the normal mode, it operates with a field of view of 15° in the gesture sensor mode), by reducing the number of interrogated photodetectors. Thus, an optimal ratio of parameters is realized to obtain an image of a user's gesture.

To operate in the 3D scanner mode, the sensor device can be switched to a mode with a low frame rate (e.g., if the sensor device operates at 10 frames/see in the normal mode, it operates at 1 frame/see in the 3D scanner mode); with a high resolution (e.g., if the sensor device operates with a resolution of 5 mm in the normal mode, it operates with a resolution of 1 mm in the 3D scanner mode); and with a large angle of view (e.g., if the sensor device operates with a field of view of 50° in the normal mode, it operates with a 70° field of view in the 3D scanner mode) by switching on all available photodetectors. Thus, an optimal ratio of parameters is realized for obtaining a three-dimensional image of an object, and the scanning speed does not play a significant role.

The inventors have carried out a number of studies on the parameters of such distance detecting devices used for domestic purposes, and these studies have clearly demonstrated the advantages of the claimed sensor device in comparison with similar devices known in the market.

The following devices were considered:
(1) an optical sensor device for determining the distance and velocity of objects and for recognizing the shapes and structures or materials from which these objects are made (hereinafter, referred to as a sensor device) according to the disclosure;
(2) a flare time-of-flight LIDAR (Benewake C30A);
(3) a stereo camera (Stereolabs ZED); and
(4) a triangulation LIDAR (RPLidar M8A1).

The studies were carried out according to the following criteria: 1) the determined distance, 2) the use of mechanical scanning, 3) the radius of the dead zone, 4) accuracy, 5) interference with other sensors. Table 1 clearly demonstrates the results of the studies obtained.

Criterion 1) All tested devices operate at approximately the same order of magnitude, with the exception of the stereo camera, which is capable of measuring distances up to 25 m.

Criterion 2) All devices under test, with the exception of the triangulation LIDAR (RPLidar M8A1), do not require mechanical scanning.

Criterion 3) All devices under study have a certain dead zone at which they cannot operate: for example, in the case of the time-of-flight lidar 2, this zone is 10 cm, since at this distance the radiation intensity is too high and the sensor is illuminated, and the stereo camera 3 operates due to the stereo effect provided by two cameras separated by a certain distance, called a stereo base (usually a few tens of centimeters). Moreover, to observe the stereo effect, it is necessary that the observed object falls into the field of view of both cameras. Because the field of view of the cameras is limited, the stereoscopic field of view of the stereo camera is also limited. In this case, the minimum distance for operation is comparable to the stereo base, i.e., several tens of centimeters.

For the operation of the LIDAR 4 (RPLidar M8A1), a minimum distance of about 15 cm is required between the emitter and the receiver, and if the distance is less, the LIDAR 4 is unable to function. On the contrary, the claimed optical sensor device 1, due to its heterodyne principle of operation, practically has no dead zone, since the distance measurement is based on measurements of the frequency difference between the emitted and received light, and zero frequency will correspond to zero difference, i.e., zero distance, and namely, the absence of a dead zone is a significant advantage of the claimed sensor device.

Criterion 4) The claimed sensor device according to the disclosure showed a higher resolution when measuring distance (less than 1 mm), in contrast to other devices.

Criterion 5) The claimed device 1 completely excludes the influence of interference from other devices, since it is based on the heterodyne method, but the devices 2 and 4 are subject to the influence of other emitting devices, which can cause measurement errors, whereas the stereo camera 3 is not subject to the influence of other emitting devices, since it is a non-emitting passive device.

Thus, Table 1 clearly shows that the claimed device 1 is characterized by high accuracy (less than 1 mm), high reliability (absence of mechanical moving parts), and is completely unaffected by interference from other emitting devices due to the heterodyne principle of operation.

Figure 10:
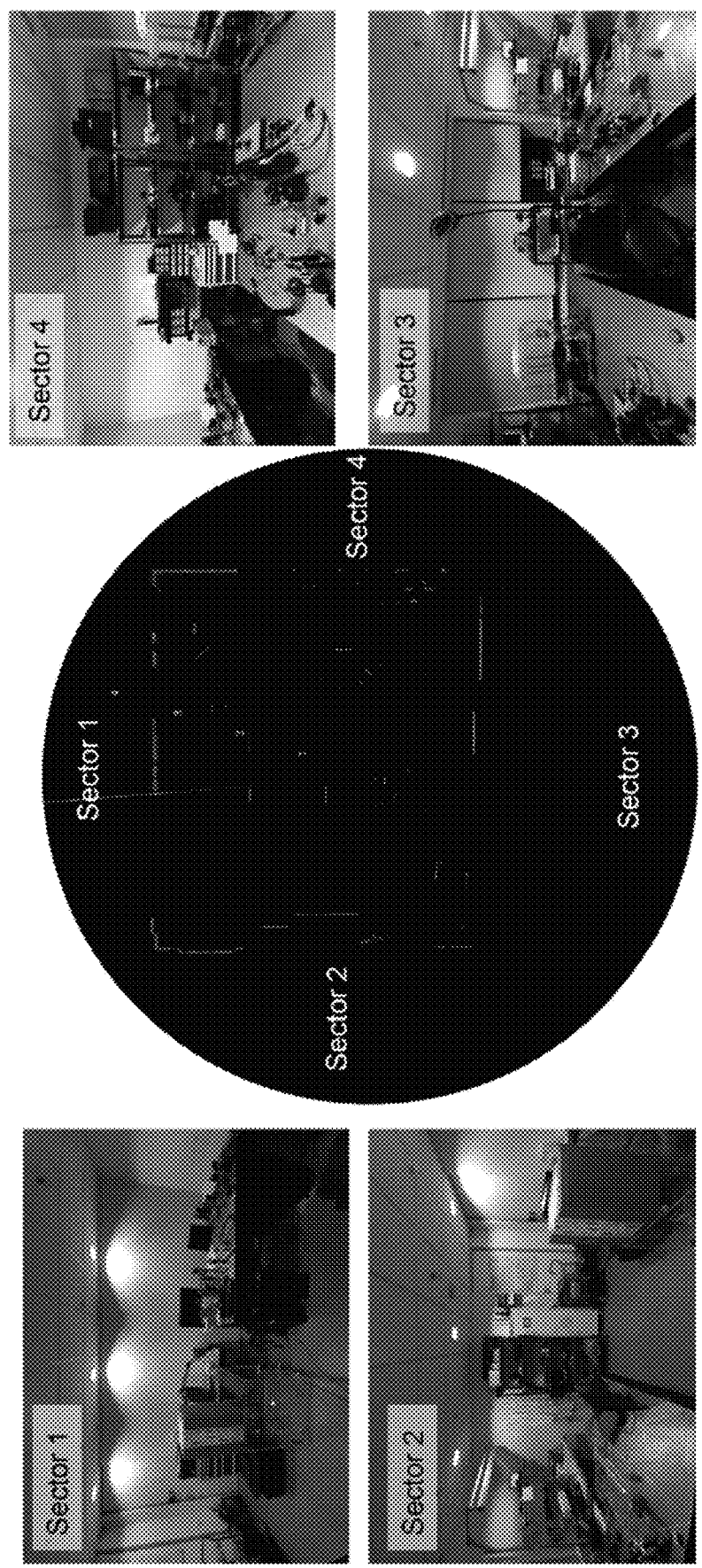
FIG. 10 shows a navigation map generated by a computer based on data received from the controller when identifying objects in the research laboratory according to an embodiment of the disclosure.

The inventors conducted experimental studies to identify the shapes and structures of objects using the claimed sensor device (see FIG. 10).

FIG. 10 shows a navigation map generated by a computer based on data received from the controller when identifying objects in the research laboratory according to an embodiment of the disclosure.

Referring to FIG. 10, photographs of sectors 1-4 of the experimental laboratory are shown in the corners, and in the center of FIG. 10, there is a dark circle, in the center of which the claimed sensor device is located that forms a navigation map built by a computer based on data received from the controller 9. On the dark circle, small sections corresponding to small objects (cabinets, shelves, laptops) and large sections (segments of straight lines) corresponding to walls are clearly visible in sectors.

Figure 11:
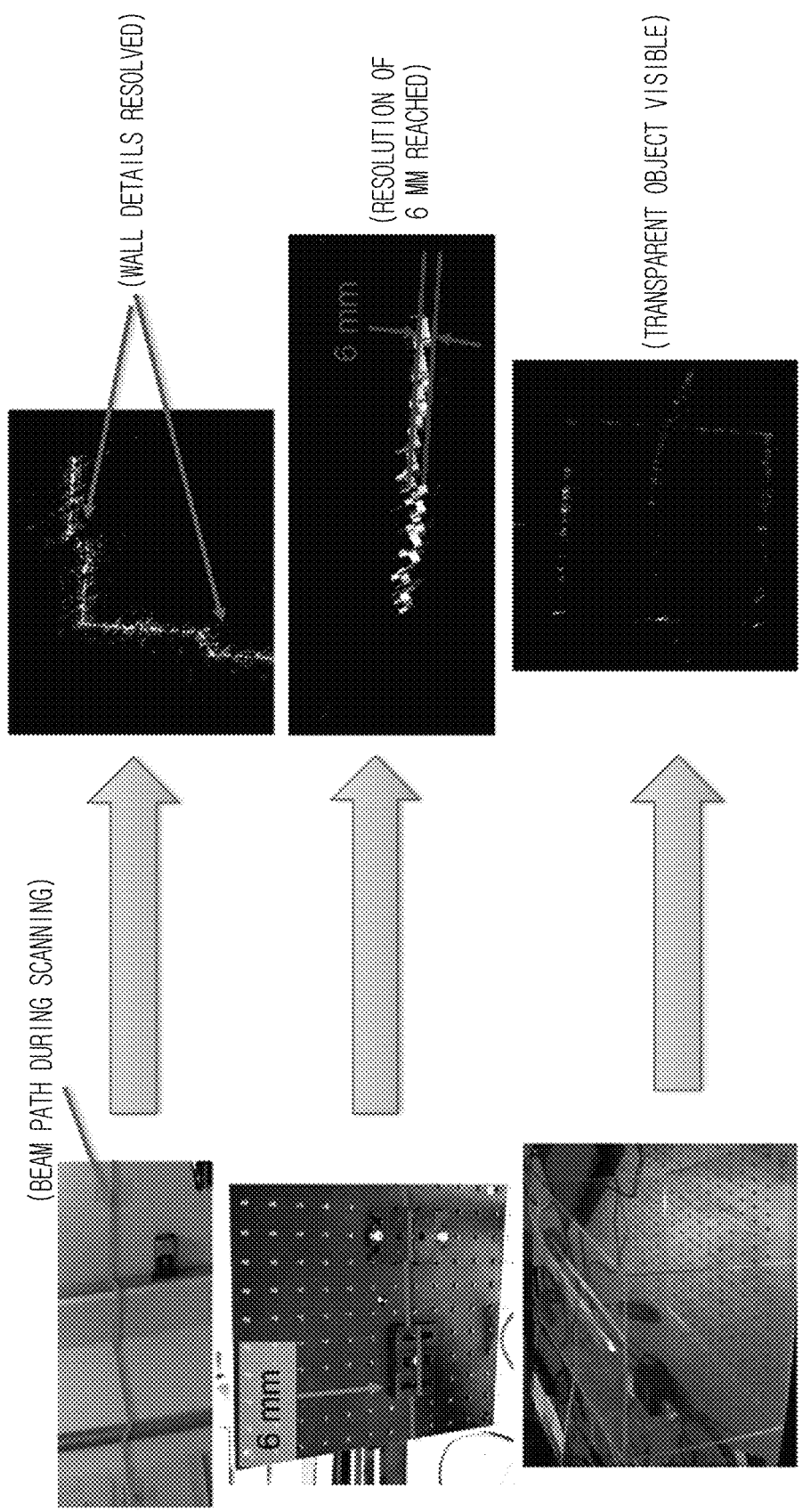
FIG. 11 shows an enlarged view of the details of images of the objects in FIG. 10 according to an embodiment of the disclosure.

FIG. 11 shows the details of the images from FIG. 10 (in an enlarged view), where photographs of individual laboratory elements are presented on the left side of the figure, wall sills are shown on the top left of the photograph, which are displayed on the corresponding photograph of the navigation map on the right, where the wall sills are clearly visible according to an embodiment of the disclosure.

Referring to FIG. 11, the photo in the middle left shows fine details and how they are displayed on the navigation map, with a resolution up to 6 mm. The bottom photo on the left shows a plexiglass cube, while its front and back faces are clearly visible on the right.

Thus, the inventors clearly demonstrate the ability of the claimed sensor device to recognize the shapes and structures of objects in a room.

Figure 12:
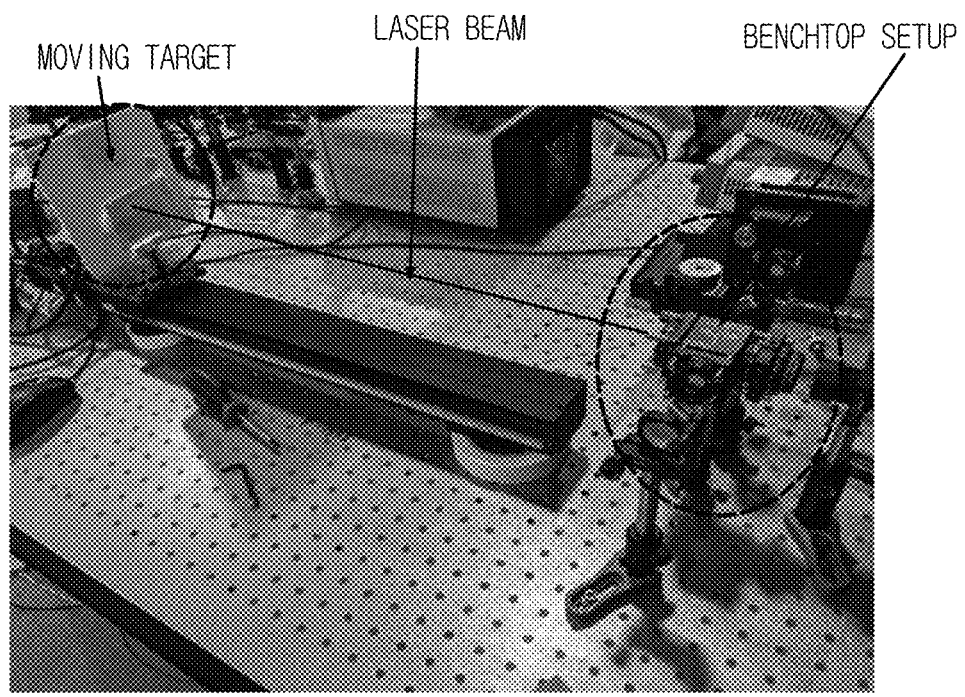
FIG. 12 is a schematic diagram of a system for experimental research on the accuracy of measuring the velocity of a moving object using the claimed sensor device according to an embodiment of the disclosure.

The inventors conducted experimental studies on the accuracy of measuring the speed of a moving object using the claimed sensor device (see FIG. 12).

FIG. 12 is a schematic diagram of a system for experimental research on the accuracy of measuring the velocity of a moving object using the claimed sensor device according to an embodiment of the disclosure.

Referring to FIG. 12, a plastic plate is placed as a moving object on a linear motor capable of speeds from 5 mm/s to 500 mm/s. The declared sensor device is placed, according to FIGS. 2A and 2B, opposite the object located on the linear motor. When starting the linear motor, the plastic plate moves at a speed of 5.16 mm/s, while the plate speed measured by the claimed sensor device is 5.27 mm/s, and when the linear motor develops a speed of 499.2 mm/s, the measurement error is +2.1%, and in case the measured speed is 495.45 mm/s, the measurement error decreases significantly, i.e., the error is −0.8%.

Thus, the experimental studies carried out by the inventors have shown a high accuracy of measurements of the object's velocity.

FIG. 13 presents the results of the obtained studies of parameters of the claimed sensor device and of similar devices known from the prior art according to an embodiment of the disclosure.

Referring to FIG. 13, the optical sensor device according to the disclosure is configured to determine distance to an object and velocity of the object, as well as the structure of the object and the material of which the object is made, and can be used in sensors for navigation purposes in mobile electronic devices and compact portable devices, and for household purposes, for example, vacuum cleaners, and in other household appliances to expand their functions, in particular, as a gesture sensor, and for industrial purposes for navigating an object and contactless identification of object parameters, for example, the structure and material (composition) of the object.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An optical sensing device for identifying distance to an object and a velocity of the object, and identifying a shape and a structure of the object, the optical sensing device comprising:
    at least one laser radiation source configured to emit a beam;
    at least one optical collimator which is located on the at least one laser radiation source, and configured to pass the beam;
    a beam-splitter configured to split the beam into a reference beam and a measuring beam;
    a light reflector configured to reflect the reference beam;
    an optical beam guide configured to direct the measuring beam toward the object;
    at least one detector configured to detect the reference beam reflected from the light reflector and the measuring beam reflected from the object; and
    a processor connected respectively to the at least one detector and the at least one laser radiation source,
    wherein, between the at least one laser radiation source and the at least one detector, at least one individually functioning and individually adjustable measuring channel is formed, the at least one measuring channel configured to provide object data based on the reference beam and the measuring beam, and
    wherein the processor is configured to:
        perform operational control of radiation parameters of the at least one laser radiation source, depending on a required operational range resolution during an operation of the optical sensing device, and
        process and analyze the object data sensed by the at least one detector through the at least one measuring channel for performing identification of a distance L to the object and identification of a velocity V of the object, and identification of the shape and structure of the object, simultaneously,
    wherein the identification of the shape and structure of the object is performed based on a pattern of a distribution of a reflection coefficient of the at least one measuring beam reflected from the object.

2. The optical sensing device of claim 1, wherein the at least one laser radiation source is a wavelength tunable laser.

3. The optical sensing device of claim 2, wherein the wavelength tunable laser is a Vertical Cavity Surface Emitting Laser (VCSEL).

4. The optical sensing device of claim 1, wherein the at least one laser radiation source comprises a number of laser radiation sources forming a two-dimensional array of laser radiation sources.

5. The optical sensing device of claim 1, wherein the at least one detector is an array photodetector.

6. The optical sensing device of claim 1, wherein the at least one detector comprises a number of detectors forming a two-dimensional array of detectors.

7. The optical sensing device of claim 1,
    wherein the at least one optical collimator is at least one microlens, and
    wherein the at least one optical collimator is configured to collimate a beam emitted by the at least one laser radiation source.

8. The optical sensing device of claim 7, wherein the at least one microlens is a set of microlenses forming a two-dimensional array of microlenses.

9. The optical sensing device of claim 1, wherein the beam-splitter is a beam-splitting cube with a semi-reflecting mirror disposed inside the beam-splitting cube and configured to split the beam into the reference beam and the measuring beam.

10. The optical sensing device of claim 1, wherein the light reflector is a light-reflecting coating applied to an inner surface or an outer surface of the beam-splitter and configured to re-reflect the reference beam to the at least one detector.

11. The optical sensing device of claim 1, wherein the light reflector is a mirror disposed in front of an outer surface of the beam-splitter and configured to re-reflect the reference beam onto the at least one detector.

12. The optical sensing device of claim 1, wherein the optical beam guide is a lens having a flat surface on a side facing the beam-splitter, and having a surface consisting of at least one microlens on a side facing the object.

13. The optical sensing device of claim 12, wherein respective the at least one microlens corresponds to the at least one laser radiation source.

14. The optical sensing device of claim 12, wherein respective the at least one microlens is disposed at a predetermined angle to a corresponding incident laser beam and is made such that a corresponding laser beam, after passing through the microlens, is directed in a predetermined direction towards the object.

15. The optical sensing device of claim 1,
    wherein the optical beam guide is a two-dimensional array of microlenses, and
    wherein respective microlenses of the two-dimensional array of microlenses are disposed at a predetermined angle to a corresponding incident laser beam and are configured to direct a corresponding laser beam, after passing through microlens, in a required predetermined direction towards the object.

16. The optical sensing device of claim 1, further comprising:
    at least one driver,
    wherein the at least one driver is connected to the at least one laser radiation source, and
    wherein the at least one driver is configured to provide a pumping current to the at least one laser radiation source according to a control signal of the processor.

17. The optical sensing device of claim 1, further comprising:
    an optical isolator,
    wherein the optical isolator is located between the beam-splitter and the at least one optical collimator, and
    wherein the optical isolator is configured to prevent light reflected from a target object from hitting the at least one laser radiation source and prevent destabilization of operations of laser radiation sources.

18. A method for identifying distance to an object and velocity of the object, and identifying a shape and structure of the object by using an optical sensing device, the method comprising:
    emitting a beam with a predetermined wavelength using at least one laser radiation source, while adjusting a pumping current supplied to the at least one laser radiation source depending on a required operation resolution during an operation of the optical sensing device; and directing the beam to a beam splitter, wherein a reference beam which is a part of the beam is directed to at least one detector, a measuring beam which is another part of the beam is directed to a beam guide, and is directed to a predetermined direction towards the object, and the measuring beam reflected from the object is directed to the at least one detector, and wherein the method further comprises:

based on a frequency difference of signals generated by the measuring beam and the reference beam, identifying a distance L to the object and a velocity V of the object simultaneously, and while the measuring beam is passing through the object or is reflected from the object, performing registration of a distribution of a reflection coefficient of the measuring beam reflected from the object depending on the distance to the object, and identifying the shape and structure of the object based thereon, wherein the identification of the shape and structure of the object is performed based on a pattern of a distribution of a reflection coefficient of the at least one measuring beam reflected from the object.

19. The method of claim 18, wherein the distance L (m) to the object is identified by the following ratio:

$$L = \frac{c(\Delta\omega_1 + \Delta\omega_2)}{4\alpha},$$

wherein the c is the speed of light (m/s), wherein the α is a rate of increase of a radiation frequency (Hz/s), wherein the $\Delta\omega_1$ is a frequency difference of signals formed by the measuring beam and the reference beam as the radiation frequency (Hz) increases, and wherein the $\Delta\omega_2$ is the frequency difference of the signals generated by the measuring beam and the reference beam when the radiation frequency (Hz) is dropped.

20. The method of claim 18, wherein the velocity V (m/s) of the object is identified d by the following ratio:

$$V = \frac{c(\Delta\omega_1 - \Delta\omega_2)}{2\omega_0},$$

wherein the c is the speed of light (m/s), wherein the α is a rate of increase of a radiation frequency (Hz/s), wherein the ω0 is a frequency of emitted light (Hz), wherein the $\Delta\omega1$ is the frequency difference of signals formed by the measuring beam and the reference beam as the radiation frequency (Hz) increases, and wherein the $\Delta\omega_2$ is the frequency difference of the signals generated by the measuring beam and the reference beam when the radiation frequency (Hz) is dropped.

21. The method of claim 18, wherein, in the adjusting the pumping current supplied to at least one laser radiation source, an operational change in a resolution (Res) of the distance of the object is provided, which is identified by the following relationship:

$$Res = \frac{c}{2\Omega dI}$$

wherein the c is the speed of light (m/s), wherein the $\Omega$ is a dependence of a frequency of an emitted laser light depending on a current pumped into the at least one laser radiation (Hz/mA) source $1_1 \ldots 1n$, and wherein the dI is the current amplitude modulation of the laser radiation source during scanning of the object (mA).

22. The method of claim 18, wherein the identifying the shape and structure of the object is carried out in a processor of the optical sensing device by comparing a pattern of a distribution of the reflection coefficient of the at least one measuring beam reflected from the object with known patterns of a distribution of reflection coefficients inherent in certain structures of objects stored in a memory of the processor.

23. The method of claim 22, wherein the memory of the processor stores a plurality of waveforms used to determine a structure or a material of which the object is formed.

24. The method of claim 23, wherein recognition or identification of the structure or the material of the object is performed based on the distribution of reflection coefficients along a beam path.

* * * * *